(12) United States Patent
Simon et al.

(10) Patent No.: US 8,151,008 B2
(45) Date of Patent: Apr. 3, 2012

(54) METHOD AND SYSTEM FOR PERFORMING DMA IN A MULTI-CORE SYSTEM-ON-CHIP USING DEADLINE-BASED SCHEDULING

(75) Inventors: Moshe B. Simon, San Ramon, CA (US); Erik P. Machnicki, San Jose, CA (US); David A. Harrison, Cupertino, CA (US)

(73) Assignee: Cradle IP, LLC, Mountain View, CA (US)

( * ) Notice: Subject to any disclaimer, the term of this patent is extended or adjusted under 35 U.S.C. 154(b) by 944 days.

(21) Appl. No.: 12/167,096

(22) Filed: Jul. 2, 2008

(65) Prior Publication Data

US 2010/0005470 A1    Jan. 7, 2010

(51) Int. Cl.
G06F 13/28 (2006.01)
G06F 13/30 (2006.01)

(52) U.S. Cl. .......... 710/6; 710/5; 710/22; 710/40; 710/41

(58) Field of Classification Search .............. None
See application file for complete search history.

(56) References Cited

U.S. PATENT DOCUMENTS

| | | |
|---|---|---|
| 5,179,702 A | 1/1993 | Spix et al. |
| 5,423,020 A | 6/1995 | Vojnovich |
| 5,506,969 A | 4/1996 | Wall et al. |
| 5,548,793 A | 8/1996 | Sprague et al. |
| 5,787,482 A | 7/1998 | Chen et al. |
| 5,812,799 A | 9/1998 | Zuravleff et al. |
| 5,867,735 A | 2/1999 | Zuravleff et al. |
| 6,006,303 A | 12/1999 | Barnaby et al. |
| 6,195,676 B1 | 2/2001 | Spix et al. |
| 6,212,544 B1 | 4/2001 | Borkenhagen et al. |
| 6,212,657 B1 | 4/2001 | Wang et al. |
| 6,567,839 B1 | 5/2003 | Borkenhagen et al. |
| 6,802,064 B1* | 10/2004 | Yao et al. .............. 718/102 |
| 6,877,053 B2 | 4/2005 | Lahiri et al. |
| 7,020,161 B1 | 3/2006 | Eberle et al. |
| 7,222,222 B1 | 5/2007 | Vertti et al. |
| 2002/0078028 A1* | 6/2002 | Lisanke ................ 707/1 |
| 2005/0021921 A1* | 1/2005 | Blackmon et al. ........ 711/168 |
| 2005/0063392 A1* | 3/2005 | Ofuji et al. ........... 370/395.42 |
| 2005/0177633 A1 | 8/2005 | Plunkett |
| 2005/0188164 A1 | 8/2005 | Ballantyne et al. |
| 2006/0085582 A1 | 4/2006 | Shikano et al. |
| 2006/0190942 A1 | 8/2006 | Inoue et al. |
| 2009/0100433 A1* | 4/2009 | Kang et al. ............... 718/103 |

* cited by examiner

Primary Examiner — Ilwoo Park
(74) Attorney, Agent, or Firm — Schneck & Schneck

(57) ABSTRACT

A direct memory access (DMA) engine schedules data transfer requests of a system-on-chip data processing system according to both an assigned transfer priority and the deadline for completing a transfer. Transfer priority is based on a hardness representing the penalty for missing a deadline. Priorities are also assigned to zero-deadline transfer requests in which there is a penalty no matter how early the transfer completes. If desired, transfer requests may be scheduled in timeslices according to priority in order to bound the latency of lower priority requests, with the highest priority hard real-time transfers wherein the penalty for missing a deadline is severe are given the largest timeslice. Service requests for preparing a next data transfer are posted while a current transaction is in progress for maximum efficiency. Current transfers may be preempted whenever a higher urgency request is received.

15 Claims, 2 Drawing Sheets

METHOD AND SYSTEM FOR PERFORMING DMA IN A MULTI-CORE SYSTEM-ON-CHIP USING DEADLINE-BASED SCHEDULING

TECHNICAL FIELD

The present invention relates to priority control in handling memory access requests in multi-core processor systems, and in particular relates to direct memory access (DMA) by several processors in a system-on-chip using deadline-based scheduling, with emphasis on minimizing the penalty for any missed deadlines.

BACKGROUND ART

In a typical multi-core system-on-chip (SoC), all the processors share an external main memory (usually DRAM). There are also smaller on-chip local memories in the SoC. The SoC has a hardware memory subsystem that performs requested memory accesses and data transfers to and from the external memory. Processors post requests directly to the memory subsystem as they execute instructions that reference memory. The memory subsystem has a DMA engine that accepts requests for memory transfers from the processors, interfaces to the external memory and performs the requested memory accesses. The DMA engine schedules memory transfers using a deadline-based algorithm. One DMA engine services the entire SoC.

When a processor executing an application that has hard real-time deadlines requests a DMA transfer, there are two factors the programmer needs to take in account: the size of the transfer, and the time by which the transfer needs to be completed. In every system there is also a maximum data rate that is attainable when one DMA transfer is being serviced, which, together with the two aforementioned factors, determines the latest time that the processor can post the transfer request to the engine and still meet the deadline for completing a transfer:

Latest Post Time=Time transfer needs to complete–transfer size/max data transfer rate Processors will in general post transfer requests earlier, sometimes much earlier, than the Latest Post Time.

In standard DMA engine designs, the engine services the transfer requests in chronological order of posting. This scheduling policy is very likely to be close to optimal when there is just one thread of control. However in a multi-threaded single-core SoC or in a multi-core SoC, this scheduling policy is often sub-optimal. There are in general multiple simultaneous contenders for DRAM bandwidth, and whether or not any one processor will meet its deadline may depend on whether other processors are also using the DMA engine. For example, consider a situation where one processor posts its transfer request much earlier than it needs to, and thereby precedes a second processor's posting. Suppose the second processor posts its request just in time, while the first processors transfer is still taking place. Then the second processor's transfer cannot meet its deadline, unless it preempts the first transfer.

Clearly a DMA system design that allows deadlines to be met independently of request posting time provides advantages to the programmer and application designer on a multi-thread or multi-core SoC. In such a design any thread or processor can post transfer requests as early as desired, without affecting the ability of any transfers to meet their deadlines. It is a well-known fact that in a system where there is sufficient bandwidth for all deadlines to be met, the scheduling policy that schedules transfers in order of their deadlines will meet all deadlines. So a DMA engine system that schedules transfers in deadline order will be optimal in this respect, meeting all deadlines whenever that is possible.

It is possible to provide a software library that accepts transfer requests, orders them in deadline order, and then passes them onto a standard DMA hardware engine. As long as there is a hardware capability in the DMA engine for transfers to be interrupted in the middle, i.e., preempted, such a library can implement a deadline-based scheduling policy. However, the overhead of such a library is likely to be excessive when transfer sizes are small. In many multimedia applications, such as MPEG-2, MPEG-4, H.264 and JPEG video encoders/decoders, typical DMA transfers move 2-dimensional arrays of 4*4, 8*4, 4*8, 8*8 and 16*16 bytes. These transfers typically require only a few tens of memory clock cycles each, but are very numerous. The overhead for software ordering will likely exceed the memory access time. But a hardware deadline-based scheduler has much lower ordering overhead than a software deadline-based scheduler, so with hardware the ordering of transfers can more easily be parallelized with memory access completely.

U.S. Pat. No. 5,423,020 to Vojnovich discloses a system including a DMA controller that optimizes bus and DRAM use by varying DMA packets size and looking at arrival times and buffer occupancy.

U.S. Pat. No. 5,506,969 to Wall et al. discloses a method for bus bandwidth management where you give urgency information to the DMA engine. In one embodiment, there's a time-driven management policy that uses shortest deadline first ordering. It determines if the bus has enough bandwidth to meet all deadlines and either (a) orders transfers in terms of deadline, when possible, or (b) defers lower priority requests, when the schedule cannot be met.

U.S. Pat. No. 5,548,793 to Sprague et al. discloses a system for controlling arbitration using memory request signal types representing requests of different priorities from different processors.

U.S. Pat. No. 5,787,482 to Chen et al. discloses a deadline-based scheduler for disk drives (rather than memory chips) that trades off maximum throughput from the disk versus trying to order requests in the order that the applications want them (i.e., deadline order). A heuristic approach for scheduling assumes that an application can assign simple deadlines and doesn't face issues where deadline is not the only factor in assigning a priority.

U.S. Pat. No. 5,812,799 to Zuravleff et al. discloses a non-blocking load buffer (NB buffer) and a multiple-priority memory system for real-time multiprocessing. The NB buffer is a block, similar to a global bus interface, with FIFOs that interface between processors and memories and I/O peripherals. By buffering read and write requests it makes the processors more independent. It addresses issues of a processor being idle while it reads data from high-latency memory or slow peripherals, without having a DMA engine. There may be different priority-based queues so that a high-priority queue doesn't get filled with low-priority requests. Thus, the NB buffer may give processors (or threads) different priorities, assign different FIFOs for each I/O peripheral, and order transactions according to an earliest deadline first strategy to get better DRAM utilization.

U.S. Pat. No. 6,006,303 to Barnaby et al. discloses a memory architecture having multiple DMA engines accessing a common resource. Each engine maintains statistics and updates changes priority dynamically based on changing access demand conditions according to an arbitration scheme that includes latency, bandwidth and throughput.

SUMMARY DISCLOSURE

The present invention is a DMA engine employing deadline-based scheduling in hardware, in which priorities are assigned to transfer requests based on the hardness or penalty characteristics of missing a deadline. This includes assigning priorities for zero-deadline transfers where there will be some definite penalty however early a transfer's completion time is, with the penalty increasing with increasing completion time. The scheduling policies combine time slots with the priorities to perform transfers of greater urgency first, and include preemption of transfers by higher urgency requests so as to guarantee that hard real-time deadlines will always be met, even when the system is overloaded.

The deadline-based DMA engine uses a global free-running clock (FRC) to implement deadlines. Each transfer request has a priority, and a deadline in units of FRC cycles. Transfers are executed in priority order; transfers of the same priority are executed in deadline order, earliest deadline first. The term "of higher urgency" is used to describe the transfer that is either of higher priority, or of equal priority and earlier deadline, than other transfers. Posting a higher urgency transfer than the current transfer causes the engine to preempt the current transfer, replacing it with the higher urgency transfer. The priority represents the various levels of hardness of deadlines in real-time systems, where the hardness of a deadline is a measure of the cost of failing to meet it. There are 4 types (priorities, ranging from 0 (high) to 3 (low)) of DMA transfers, classified by the severity of the penalty that is paid if a deadline is missed:

- Priority 0: Hard real-time transfers, for example input video data. These are transfers where the penalty for missing a deadline is severe.
- Priority 1: High-priority zero-deadline soft realtime transfers, for example critical-path-processor code swapping. These are transfers where there is a definite penalty however early the completion time is, the penalty increasing with completion time.
- Priority 2: Low-priority zero-deadline soft realtime transfers, for example non-critical-path-processor code swapping. These are transfers where there may be a penalty however early the completion time is, the penalty increasing with completion time.
- Priority 3: Soft real-time transfers, for example encoding a video line. These are transfers where there is no penalty if the transfer completes in time, and a tolerable penalty for missing the deadline.

The engine is designed to operate at maximum efficiency. The DRAM memory is idle only if there are no DMA transfers active and no processor instruction-originated accesses to DRAM. All scheduling and pipelining performed by the hardware memory subsystem is parallelized with DRAM activity, and incurs no overhead. There is built-in logging of transfers for any needed debugging.

DETAILED DESCRIPTION

DMA Engine Theory of Operation
Command FIFOs and Parameter Blocks

Figure 1:
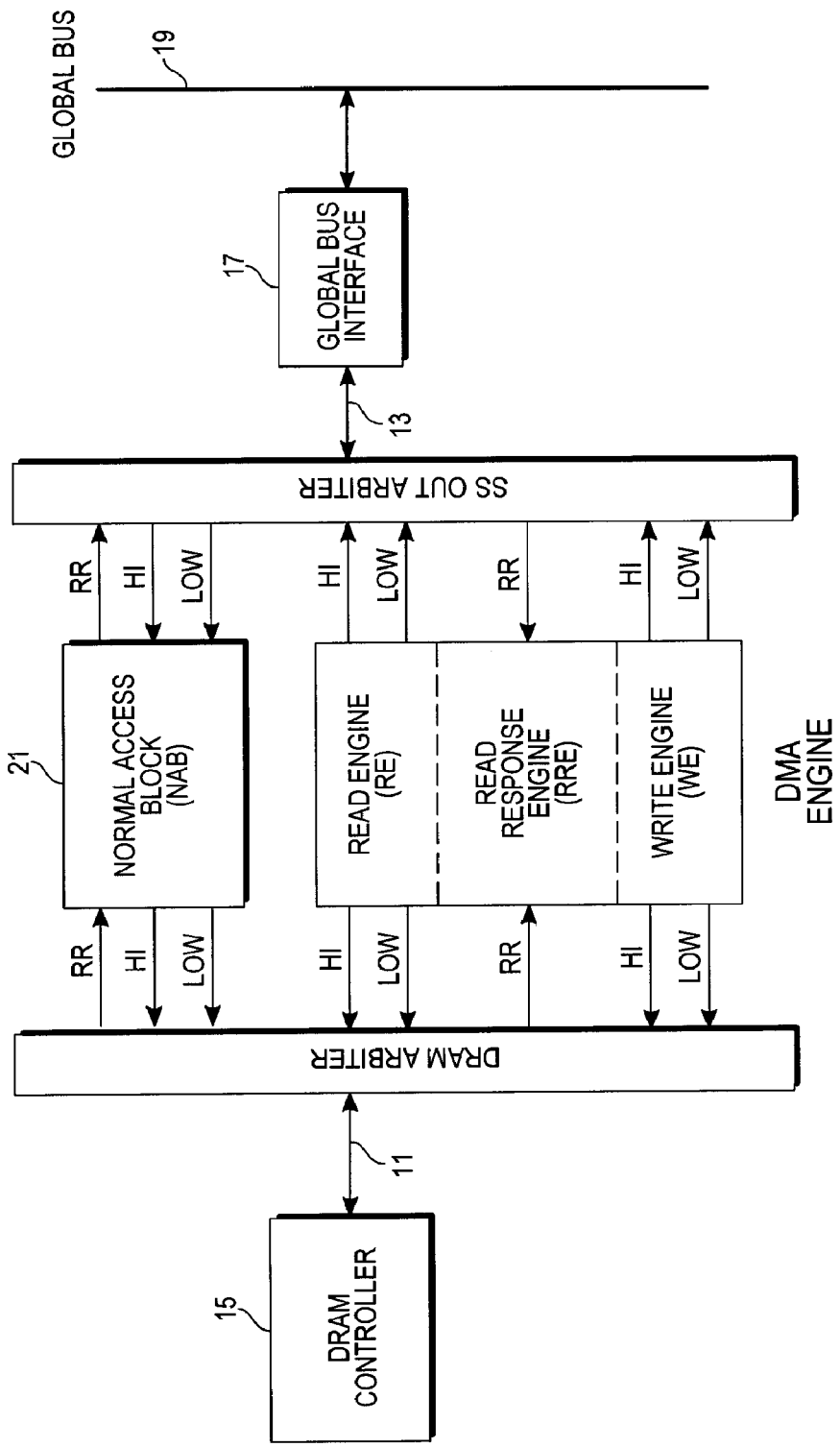
FIG. 1 shows an overall schematic of an exemplary DMA engine in accord with the present invention interfacing with a DRAM controller and global bus interface GBI in a hardware memory supervision system.
Figure 2:
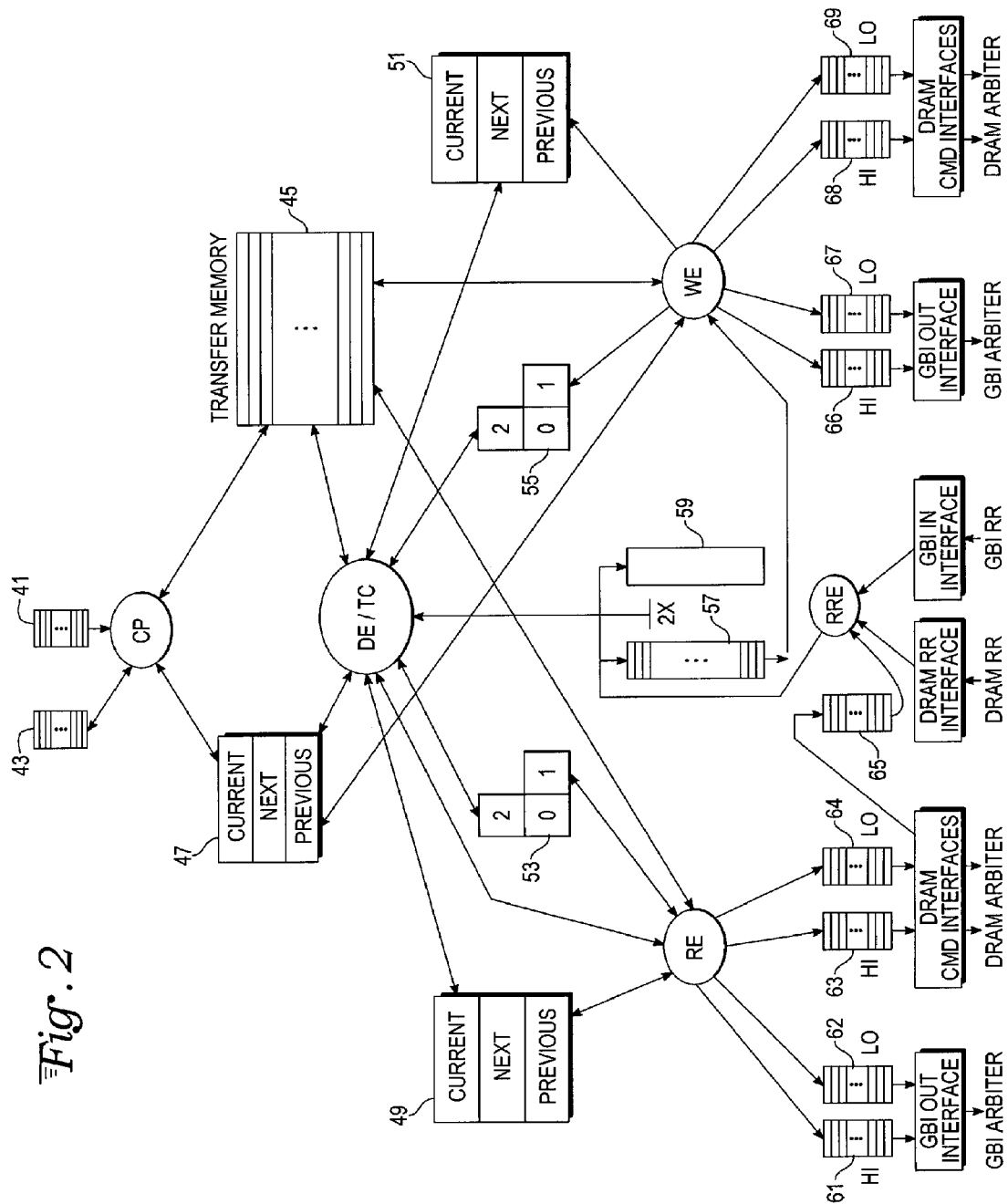
FIG. 2 shows details of the DMA engine of FIG. 1 including various sub-engines and FIFO registers.

With reference to FIGS. 1 and 2, the engine has four 16-deep command FIFO registers 41, servicing four different transfer priorities. Commands are pointers to a parameter block in DRAM or LMEM specifying a transfer's addresses and size, and its deadline. The command FIFO 41 written to determines the priority. Processors post a transfer request by setting up a parameter block, and writing a command to a command FIFO 41.

Parameter blocks specify a 2-dimensional data transfer. They contain source and destination addresses for the transfer, and transfer size information. An interrupt is optionally generated at end of transfer. Parameter blocks can optionally be chained, the transfers being executed in sequence without requiring additional individual transfer commands after the first command.

Channels and Transfers

The DMA engine allocates a channel to each transfer. There are a fixed number (128 in this example) of channels available. When the transfer completes, the engine de-allocates the channel. Channels are allocated from a pool. There are 4 pools, P0, P1, P2, and P3, formed using 4 channel pool FIFO registers 43. The pools are disjoint. Priority 0 transfers use pools P0, P1, P2 and P3 in that order; priority 1 transfers use pools P1, P2 and P3 in that order; priority 2 transfers use pools P2 and P3 in that order; and priority 3 transfers use pool P3. This allocation strategy gives a bias to higher priority transfers.

Scheduling

There are three scheduling algorithms available:

The SIMPLE algorithm executes transfers in order of urgency, completing one transfer before moving on to the next. An incoming command of higher urgency preempts the current transfer.

The TIMESLICING algorithm timeslices among the priorities, with a user-defined timeslice-length for each priority. Typically, priority 0 transfers have a large timeslice, and the other priorities have a small timeslice. This means that priority 0 transfers will periodically give up some bandwidth to lower priority transfers. The algorithm bounds the latency of short-deadline low-priority transfers and they can no longer locked out indefinitely by higher priority transfers.

The HYBRID algorithm is a combination of the SIMPLE and TIMESLICING algorithms. It timeslices between priority 0 transfers on the one hand and priority 1/2/3 transfers on the other. The timeslice assigned to priority 1/2/3 transfers is allocated to the most urgent transfer among the transfers having priorities 1/2/3.

The engine overlaps the tail of each transfer (writing of the last data set) with the head of the next transfer (the reading of the first data set). So up to 2 transfers can be in-service at any one time. In some SoCs, where data transfer latencies may be comparable with the average transfer time, it may be necessary to increase the number of transfers that are executed simultaneously by the engine in order to achieve optimal DRAM bandwidth utilization. For simplicity of exposition, this document describes an engine with up to 2 transfers executing in parallel, though the number could be increased to 4 or even more if needed.

Preemption

The engine performs transfers in order of urgency, where urgency is determined by the command priority (dynamically adjusted when the scheduling algorithm is TIMESLICE or HYBRID to become the adjusted priority) and the deadline. The engine will preempt the current transfer if:

A new transfer command is received whose urgency is greater than one of the current transfers' urgency.

The scheduling algorithm is TIMESLICE or HYBRID, the current timeslice expires and there is an active transfer that now has higher urgency than the current transfer.

Real Time Deadlines and Transaction Priorities

The SoC internal data transfer protocol has split-transaction reads (read command and read response are 2 separate transactions) and single transaction writes (write command and write data are a single transaction). The DMA engine has two ports 11 and 13, one going to the DRAM controller 15, and one going via a global bus interface 17 to the SoC's internal global bus 19. The DMA engine posts read-command bursts, it merges read-response data, and posts write-command bursts to these ports. The engine posts multiple bursts for each in-service transfer until the transfer completes.

In order to provide guaranteed hard real-time deadlines the SoC has two transaction priorities. At every node in the data transport fabric of the SoC there are three queues. One queue is for read-responses, one queue is for high-priority read and write transactions and one queue is for low-priority read and write transactions. At the DRAM interface there are two queues, one for high-priority read and write transactions and one for low-priority read and write transactions. Read responses are given top priority so as to prevent deadlocks, high-priority transactions are next, and low-priority transactions have lowest priority.

The DMA engine and the processors generate both high- and low-priority read and write transactions. For each transfer, the DMA engine generates either all high-priority transactions, or all low-priority transactions.

The DMA engine generates high-priority or low-priority DRAM and global bus transactions as follows:

The priority of DMA transactions depends on the transfer command priority. A 4⇒2 transfer-priority⇒transaction-priority map programmed into the DMA engine control register assigns the transaction priorities.

The engine generates hi-priority DRAM transactions for all parameter block fetches.

The engine generates hi-priority transactions for all logging transactions.

The engine generates EOT interrupt transactions with the same priority as for the data transfer transactions of the transfer.

DRAM Bandwidth, Bursting and Transactions

Today, the most cost effective external memories are DRAMs. A typical example, double-data-rate (e.g., DDR2) DRAM with a 64-bit data bus, is able to transfer 1 octet (8-byte block) every clock edge, giving a theoretical maximum rate of 5.4 GBytes/sec when the clock rate is 333 MHz. A typical controller accesses DRAM memory in units of transactions, where each transaction ranges from 1 octet to 8 octets.

The SoC memory controller accepts two types of requests: processor instruction-originated requests (Normal Access Block 21, a.k.a. NAB, requests) and DMA engine originated requests. With DDR memories, the available memory bandwidth depends on the transaction address sequence and on the transaction sizes. It is most efficient to burst transactions so that successive transactions access consecutive addresses. When addresses are sequential, most of the transactions will access the same page of DRAM memory, and it will not be necessary to perform a page-close followed by a page-open operation on the DRAM page miss). Bursts of 4 or 8 transactions with consecutive addresses are very beneficial, and are possible with DMA transfers when the transfer sizes are large. A burst of accesses incurs about one page miss (require a page close operation followed by a page open operation) per burst of transactions. NAB accesses are small, so are not bursted, and because they are interleaved from multiple independent sources (multiple processors), have an almost 100% page miss rate per transaction.

The 5.4 GHz (theoretical maximum rate of transfer) number reduces in practice due to:

DRAM controller inefficiencies (some listed here)
Limited ability of DRAM controller to overlap page close with page open
Controller require 4 cycles minimum for any size transaction
DRAM refresh overhead
Cycles are wasted when interleave of reads and writes
DRAM transaction sizes being less than maximal
Average size of transaction<maximal⇒~linear degradation
Traffic patterns
Page miss rate⇒reduction in DRAM bandwidth: 20% page miss rate reduces bandwidth from 5.4 GBytes/sec to 3.9 GBytes/sec.
Amount of NAB activity (most transactions<1 octet, almost all cause page miss)

The memory supervision system described here has a DRAM controller that performs accesses of width 1-8 octets to DRAM, and can have 4 or 8 memory banks (pages) open at any time. The upper address bits of the address determine the page, and page size depends on memory hardware, varying between 2K bytes to 32 K bytes.

The exemplary system-on-chip described here has internal data transactions of 1, 2 or 4 data octets each. There are 3 types of transaction. They are read commands, write commands, and read responses. Read commands have 1 command octet, read responses have 1, 2 or 4 data octets and write commands have 1 command octet followed by 1, 2 or 4 data octets.

The memory supervision system and system-on-chip could have other DRAM controller characteristics, other sizes of DRAM transactions and other sizes of internal transactions. The design described here is generic, and is compatible with a wide range of DRAM controller and internal transaction architectures.

In this design, the DDR2 DRAM controller supports 1-octet, 2-octet, 4-octet and 8-octet read and write transactions directly. The Global Bus Interface (GBI) supports 1-octet, 2-octet and 4-octet transactions. The DMA engine sends multiple optimally-sized read and write transactions to the DRAM and GBI, sending up to MAX_RD_DRAM, MAX_WR_DRAM, MAX_RD_GBI and MAX_WR_GBI transactions in any burst. Bursts can reach 64 octets.

Parameter Blocks

In the following parameter block table, there is a DEADLINE field (Word 5), which defines the deadline for a transfer request (a delta value, measured in units of 256 free-running clock (FRC) cycles. The deadline is added to the time the command arrives at the command FIFO 41 (command timestamp) to give the absolute time by which the transfer should complete. The DEADLINE field is 32 bits, and when added to the FRC time uses bits 40:8 of the FRC value. This allows for deadlines many seconds into the future. The command timestamp is 56 bits, using bits 63:8 of the FRC.

There is also a TAG field (in Word 3). This field is for debug purposes. It is attached to each log entry of a transfer so it can be used to filter DMA engine logs. It is also attached to each DRAM transaction generated by the DMA engine, and on-chip DRAM controller monitors can filter it. In addition, the 6 LSBs of the field are appended to the 2-bit subdevice-id of each DMA transaction to form the transaction subdevice id, and can be used by SoC profiling monitors to track the transactions of particular transfers.

Parameter Block Table

| | Bit | Name | Comment |
|---|---|---|---|
| Word 0 | | Options | |
| | 31:30 | | Reserved |
| | 29 | LOGGING_EN | 0—no logging for this transfer<br>1—logging enabled for this transfer |
| | 28:27 | | Reserved |
| | 26 | INT | Generate interrupt at end-of-block |
| | 25 | | Reserved |
| | 24 | CHAIN | Automatically chain to next block |
| | 23:22 | DIR | Direction of transfer<br>00 ⇒ Read from DRAM, write to GBI<br>01 ⇒ Read from DRAM, write to DRAM<br>10 ⇒ Read from GBI, write to DRAM<br>11 ⇒ Read from GBI, write to GBI |
| | 21:19 | | Reserved |
| | 18:0 | NUM_LINES | Number of 2-D lines |
| Word 1 | | Destination | |
| | 31:0 | DEST_ADDR | Destination of first line to be moved. Must lie in DRAM if write port is DRAM. |
| Word 2 | | Source | |
| | 31:0 | SRC_ADDR | Source of first line to move. Must lie in DRAM if read port is DRAM. |
| Word 3 | | Count and Tag | |
| | 31:16 | TAG | Transfer tag: 6 LSB's form 6 LSBs of subdevice id |
| | 15:0 | LINE_LENGTH | Number of bytes per line |
| Word 4 | | Deltas | |
| | 31:16 | SRC_DELTA | For 2-D transfers: signed increment of source address from end of line to start of next line |
| | 15:0 | DEST_DELTA | For 2-D transfers: signed increment of destination address from end of line to start of next line |
| Word 5 | | Deadline | |
| | 31:0 | DEADLINE | Delta from now; in units of 256 FRC cycles |
| Word 6 | | Interrupt Address | |
| | 31:0 | INT_ADDR | Engine writes 0 to this address at End-of-Transfer, providing INT bit is 1. |
| Word 7 | | Reserved | |
| | 31:0 | | Reserved |

Deadlines of a Chain of Parameter Blocks

When a transfer has 2 or more chained parameter blocks, each parameter block is processed as an independent transfer but with a shared priority and deadline. The deadline is determined by the deadline delta in the first block of the chain. The first block's deadline should be programmed as the time when the entire chain must complete. The DMA engine ignores the deadline field in subsequent blocks.

Configuration of the Engine

DMA Address Map

| Address | Name | Type | Function |
|---|---|---|---|
| 0 | DMA0 Params | RO | DMA channel 0 current parameter block address |
| 8 | DMA0 octets written | RO | Octets written |
| 10 | | | reserved |
| 100 | DMA1 | RW | DMA channel 1 registers |
| 200 | DMA2 | RW | DMA channel 2 registers |
| 300-32K | DMA3-127 | RW | DMA channel 3 registers-channel 127 registers |
| 32K-64K | | | reserved |
| 10000 | DMACHSTAT0 | RO | Status of channels 0-31 (32-bit register) |
| 10008 | DMACHSTAT1 | RO | Status of channels 32-63 (32-bit register) |
| 10010 | DMACHSTAT2-3 | RO | Status of channels 64-127 (32 bit registers) |
| 10020-10400 | | | reserved |
| 10400 | LOG_STARTADDR | RW | Log start address |
| 10408 | LOG_ENDADDR | RW | Log end address |
| 10410 | LOG_CURADDR | RO | Log current address |
| 10418 | DMA Control Register | RW | Log control, STOP/RESUME control, Burst sizes |
| 10420 | DMASLICE | RW | Timeslices |
| 10428 | DMAPOOL | RW | Channel pool partitioning among 4 partitions |
| 10430 | WRITE_EARLY_TERMINATION | RW | Counter |
| 10438 | READ_EARLY_TERMINATION | RW | Counter |
| 10440 | STALLS | RW | Counter for all stalls to GBI/DRAM FIFO rds/wrs |
| 10448 | DMAENGSTAT | RW | Engine status |
| 10450 | CURRENT_PREVIOUS | RO | 0:7 = C_0; 16:23 = P_0 |
| 10458-12000 | | | reserved |

The 4 DMA channel status registers (DMACHSTAT0 through DMACHSTAT3 located at addresses 10000 to 1001F in the representative DMA address map) show whether each DMA channel is active or not. Each channel status register may have 32 bits, each bit being dedicated to indicating the status (0⇒active or 1⇒inactive) of one of the DMA channels. A channel is active if its TRANSFER_STATE is active, interrupting or chaining. A channel is inactive if its TRANSFER_STATE is inactive. The status bits provide a snapshot of channel pool utilization.

DMA Channel Status

| Bit | Name | Type | Function |
|---|---|---|---|
| 31 | DMA31 | RO | Channel 31 status: 0 => inactive, 1 => active |
| 30 | DMA30 | RO | Channel 30 status: 0 => inactive, 1 => active |
| 29 | DMA29 | RO | Channel 29 status: 0 => inactive, 1 => active |
| 28 | DMA28 | RO | Channel 28 status: 0 => inactive, 1 => active |
| 27 | DMA27 | RO | Channel 27 status: 0 => inactive, 1 => active |
| 26 | DMA26 | RO | Channel 26 status: 0 => inactive, 1 => active |
| 25 | DMA25 | RO | Channel 25 status: 0 => inactive, 1 => active |
| 24 | DMA24 | RO | Channel 24 status: 0 => inactive, 1 => active |
| 23 | DMA23 | RO | Channel 23 status: 0 => inactive, 1 => active |
| 22 | DMA22 | RO | Channel 22 status: 0 => inactive, 1 => active |
| 21 | DMA21 | RO | Channel 21 status: 0 => inactive, 1 => active |
| 20 | DMA20 | RO | Channel 20 status: 0 => inactive, 1 => active |
| 19 | DMA19 | RO | Channel 19 status: 0 => inactive, 1 => active |
| 18 | DMA18 | RO | Channel 18 status: 0 => inactive, 1 => active |
| 17 | DMA17 | RO | Channel 17 status: 0 => inactive, 1 => active |
| 16 | DMA16 | RO | Channel 16 status: 0 => inactive, 1 => active |
| 15 | DMA15 | RO | Channel 15 status: 0 => inactive, 1 => active |
| 14 | DMA14 | RO | Channel 14 status: 0 => inactive, 1 => active |
| 13 | DMA13 | RO | Channel 13 status: 0 => inactive, 1 => active |
| 12 | DMA12 | RO | Channel 12 status: 0 => inactive, 1 => active |
| 11 | DMA11 | RO | Channel 11 status: 0 => inactive, 1 => active |
| 10 | DMA10 | RO | Channel 10 status: 0 => inactive, 1 => active |
| 9 | DMA9 | RO | Channel 9 status: 0 => inactive, 1 => active |
| 8 | DMA8 | RO | Channel 8 status: 0 => inactive, 1 => active |
| 7 | DMA7 | RO | Channel 7 status: 0 => inactive, 1 => active |
| 6 | DMA6 | RO | Channel 6 status: 0 => inactive, 1 => active |
| 5 | DMA5 | RO | Channel 5 status: 0 => inactive, 1 => active |
| 4 | DMA4 | RO | Channel 4 status: 0 => inactive, 1 => active |
| 3 | DMA3 | RO | Channel 3 status: 0 => inactive, 1 => active |
| 2 | DMA2 | RO | Channel 2 status: 0 => inactive, 1 => active |
| 1 | DMA1 | RO | Channel 1 status: 0 => inactive, 1 => active |
| 0 | DMA0 | RO | Channel 0 status: 0 => inactive, 1 => active |

Timeslicing Configuration

In TIMESLICING mode, there are 2 sets of timeslicing weights. The first set is used when there are active priority-0 transfers; the second set is used when there are no active priority-0 transfers. Each set of weights has 4 fields, in units of read-bursts, one field for each priority. The field values are denoted $T_i<n>$ where $i=0 \ldots 1$ and $n=0 \ldots 3$, and lie in the range 1-16. The engine time slices among the 4 transfers (one at each priority) that have the shortest deadlines among the transfers at their priority. The engine time slices by allocating $T_i<n>$ bursts to a transfer of priority n and then swapping it out. It then swaps in the next transfer at priority n+1, allocating it $T_i<n+1>$ bursts; if there is no transfer at priority n+1, the engine continues with the round robin to priority n+2, etc.

DMA timeslicing control register

| Bit | Name | Type | Function |
|---|---|---|---|
| 31:27 | PR_0_SLICE_1 | RW | Ignored; no priority-0 transfers active |
| 27:24 | PR_1_SLICE_1 | RW | 1-16 read bursts; can be changed on the fly |
| 23:20 | PR_2_SLICE_1 | RW | 1-16 read bursts; can be changed on the fly |
| 19:16 | PR_3_SLICE_1 | RW | 1-16 read bursts; can be changed on the fly |
| 12:15 | PR_0_SLICE_0 | RW | 1-16 read-bursts; can be changed on the fly |
| 8:11 | PR_1_SLICE_0 | RW | 1-16 read bursts; can be changed on the fly |
| 4:7 | PR_2_SLICE_0 | RW | 1-16 read bursts; can be changed on the fly |
| 0:3 | PR_3_SLICE_0 | RW | 1-16 read bursts; can be changed on the fly |

In HYBRID mode, only PR_0_SLICE_0 and PR_1_SLICE_0 are used. The engine time slices between 2 sets of transfers, allocating $T_0<0>$ bursts to the most urgent transfer of priority 0 and then allocating $T_0<1>$ bursts to the most urgent transfer of priority 1/2/3.

Burst Size Configuration

There are 4 new control register fields in the DMA control register—MAX_RD_DRAM, MAX_WR_DRAM, MAX_RD_GBI and MAX_WR_GBI. These 3-bit fields specify the maximum number of transactions (1-8) that are bursted to the DRAM/IO-CORE controller or to the GBI. It is recommended that maximum values be used for all 4 fields.

DMA Engine Control Register

| Bit | Name | Type | Function |
|---|---|---|---|
| 31:28 | | | reserved |
| 27 | EARLY_TERM_WR | RW | 0—off 1- terminate write burst early if needed |
| 26 | EARLY_TERM_RD | RW | 0—off 1- terminate read burst early if needed |
| 25 | PR_3_TR_PR | RW | Transfer Priority 3 transaction priority: 0-lo, 1-hi |
| 24 | PR_2_TR_PR | RW | Transfer Priority 2 transaction priority: 0-lo, 1-hi |
| 23 | PR_1_TR_PR | RW | Transfer Priority 1 transaction priority: 0-lo, 1-hi |
| 22 | PR_0_TR_PR | RW | Transfer Priority 0 transaction priority: 0-lo, 1-hi |
| 21:20 | SCHEDULE_MODE | RW | 00—SIMPLE 01—TIMESLICING 10—HYBRID |
| 19 | LOG_END_EN | RW | Enable logging of end of transfer |
| 18 | LOG_START_EN | RW | Enable logging of start of transfer |
| 17 | LOG_CMD_EN | RW | Enable logging of arrival of command into command fifo |
| 16 | LOG_MODE | RW | 0—Circular 1—Linear |
| 15 | reserved | | |
| 14 | reserved | | |
| 13:11 | MAX_RD_DRAM | RW | Maximum number of DRAM RD transactions per burst (1-8); can be changed on the fly |
| 10:8 | MAX_RD_GBI | RW | Maximum number of GBI WR transactions per burst (1-8); can be changed on the fly |
| 7:5 | MAX_WR_DRAM | RW | Maximum number of DRAM WR transactions per burst (1-8); can be changed on the fly |
| 4:2 | MAX_WR_GBI | RW | Maximum number of GBI WR transactions per burst (1-8); can be changed on the fly |
| 1 | SINH | RW | Stop Inhibit |
| 0 | SARI | RW | Stop and Resume Inhibit |

Channel Pools

A reasonable default is to assign 32 to each of P0_SIZE . . . P3_SIZE.

| | | DMA channel pool register | |
|---|---|---|---|
| Bit | Name | Type | Function |
| 31:24 | P0_SIZE | RW | |
| 23:16 | P1_SIZE | RW | |
| 15:8 | P2_SIZE | RW | |
| 7:0 | P3_SIZE | RW | |

There are 2 bits in the DMA engine status that track channel allocation errors. Both are sticky. One bit tracks failures to allocate from the designated pool, e.g. if a priority 0 transfer is not allocated a channel from P0 because the pool is empty. The other bit tracks failures to allocate from any pool, e.g. if a priority 1 transfer is not allocated a channel from any of P1, P2, P3 because all 3 pools are empty.

| | | DMA Engine Status Register | |
|---|---|---|---|
| Bit | Name | Type | Function |
| 31:2 | | | reserved |
| 1 | ALL_CHANNELS_USED | RW | Unable to allocate channel - all channels used (sticky) |
| 0 | POOL_TOO_SMALL | RW | Channel allocated from outside designated pool (sticky) |

Recommended Scheduling Modes, Priority Maps and Timeslicing Values

Priority 0 should be reserved for hard real-time transfers. Priority 1 should be reserved for high-priority zero-deadline soft realtime transfers. Priority 2 should be reserved for low-priority zero-deadline soft realtime transfers. Priority 3 should be used for all other soft realtime transfers.

It is recommended that transfers with priorities 1 and 2 use hi-priority transactions, transfers with priorities 2 and 3 use lo-priority transactions.

Timeslice weights are recommended as follows:
 In TIMESLICING mode: 4,1,1,1 for PR_0_SLICE_0, . . . PR_3_SLICE_0; 0,4,4,4 for PR_0_SLICE_1, . . . PR_3_SLICE_1
 In HYBRID mode: 4,4 for PR_0_SLICE_0, PR_1_SLICE_0

Use SIMPLE mode if you do not care that hard real-time transfers unnecessarily delay zero-deadline transfers.

Use TIMESLICING mode to guarantee that neither short-deadline or zero-deadline transfers get shut out by higher priority transfers. When using TIMESLICING mode allocate different bandwidth to different priorities.

Use HYBRID mode to guarantee that zero-deadline high priority transfers (priority 1 transfers) do not get shut out by hard real-time transfers, but otherwise you don't care if low priority (2 & 3) transfers get shut out by higher priority transfers.

Profiling and Debug Support

The DMA engine provides extended profiling support, since complex applications depend on correct usage of priorities and deadlines to achieve efficient utilization of chip resources. The following information is available:
 Channel ids of the 2 executing transfers: 1 current, 1 previous The following information is readable on a per-channel basis:
 Channel is active/inactive
 Total octets written
 Address of parameter block.

The engine has a built-in logger, writing entries of 2-octets to DRAM. There are 3 log transaction types:
 Command-receive time
 Command-start time
 Command-end time Each log entry contains information in 2 octets. The first octet is common to all 3 types:
 2-bit log type 0, 1 or 2 for received, start and end respectively
 2-bit priority
 7-bit channel #
 16-bit tag field
 32-bit Address of the parameter block of the transfer The second octet is a 64-bit FRC value:
 time that command was pushed into command FIFO 41 (Command-receive)
 time that channel transfer became active (Command-start)
 time that channel transfer became inactive (Command-end)

Timestamps are generated from the same global FRC counter that is used to specify deadlines, which is ported into the DMA module as it is ported into other SoC modules. The FRC is set to zero at power-up; it will wrap around only after many years.

The engine pushes log write-transactions into a hi-priority FIFO as defined later in the document. If the FIFO is full when the engine needs to push a transaction into it, the engine stalls.

The DMA engine supports STOP/RESUME with 1 global bit.

DMA Sub-Engines and the Database

As seen in FIG. 2, DMA channel processing is achieved using three sub-engines operating parallel: the command processor (CP), channel scanner (CS), and transaction dispatcher (TD). The channel scanner CS has two parallel components—a deadline engine (DE) and a transaction controller (TC). The transaction dispatcher TD has three parallel components—a read engine (RE), a read response engine (RRE) and a write engine (WE).

Engine Control Database

4 Channel Pool FIFOs, 128-deep, each entry holding a 7-bit channel id: The channel pool FIFOs 43 are named P0, P1, P2 and P3. These FIFOs are used to allocate channels to transfers. The command processor CP pops items from these channel pool FIFOs 43 (allocating) and pushes items to the channel pool FIFOs 43 (deallocating). A write to a channel pool FIFO 43 at start-up causes the command processor CP to initialize the FIFOs and then start processing commands. Second and subsequent writes cause the engine to reinitialize the FIFOs. Channel ids have a range 0-127. Registers holding channel ids are usually 8-bits, to allow for a NULL value. NULL is −1 (255), since 0 is a valid channel id.

4 Command FIFOs, 16-deep, each entry hold a 32-bit parameter block address and a 56-bit timestamp (bits 63:8 of the free-running clock FRC at FIFO-push time). There is one command FIFO 41 for each priority. The command FIFOs 41 hold commands sent by processors. CT3800 CPUs push into these FIFOs; the command processor CP pops items from these FIFOs.

1 Chaining Request register, 8-bits wide, contain the channel id that is being chained: the transaction controller TC sets this chaining request register; the command processor CP clears it to NULL.

4 Transfer counters, 8 bits wide, indicate how many active transfers at each priority there are in transfer memory 45: the command processor CP increments the transfer counters; the transaction controller TC decrements.

1 Transfer Memory contains information on the state of the transfer for each of the 128 channels. All database fields are placed in this memory 45, which has 1 read/write port and an arbiter. The command processor CP initializes the transfer memory 45; command processor CP, deadline engine DE, transaction controller TC, read engine RE and write engine WE all read from and write to the transfer memory 45.

A Scan Request Flag, is set by the command processor CP every time it activates a new transfer, and set by transaction controller TC every time it terminates a transfer or preempts. The flag is cleared by deadline engine DE every time it starts a new scan of transfer memory 45. The command processor CP and transaction controller TC override the deadline engine DE.

3 pairs of Read and Write In-Service flags, an array indexed by transfer #: These read and write in-service flags 53 and 55 allow the transaction controller TC and transaction dispatcher TD, respectively, to signal the posting and completion of read and write service requests. Each set is for a transfer in the range 0, . . . 2. Each pair of flags 53 and 55 tracks respective read service requests and write service requests. The transaction controller TC sets an in-service flag 53 or 55 when it requests read or write service for the transfer. The read engine RE and write engine WE clear the corresponding read or write in-service flag 53 or 55 whenever they complete the service request. Each cycle, the transaction controller TC can read/write 1 read and/or 1 write flag, the read engine RE can read/write a read flag, and the write engine WE can read/write a write flag. The transaction controller TC on the one hand, and read and write engines RE and WE on the other, never write in the same cycle to the same flag.

3 sets of Schedule Control registers, an array indexed by transfer #: 1 set of schedule control registers 47 is for the PREVIOUS transfer, 1 set is for the CURRENT transfer, and 1 set is for the NEXT transfer. Each set of schedule control registers 47 is for a transfer in the range 0, . . . 2. Each register set 47 contains the transfer state, preemption state, channel, priority and deadline for a transfer. For the current and previous transfers, the transaction controller TC write to the registers and the command processor CP, transaction controller TC, read engine RE and write engine WE read from the registers. For the next transfer, the deadline engine DE and transaction controller TC read from the registers and deadline engine DE writes to the registers.

3 sets each of Read and Write Transfer Control Registers, an array indexed by transfer #: 1 set of read transfer control registers 49 is for the PREVIOUS read transfer, 1 set is for the CURRENT transfer, and 1 set is for the NEXT transfer. Likewise, 1 set of write transfer control registers 51 is for the PREVIOUS write transfer, 1 set if for the CURRENT transfer, and 1 set is for the NEXT transfer. Each set is for a transfer in the range 0, . . . 2. Each set contains the TOTAL_READ and TOTAL_WRITTEN fields for the transfer. It also contains the read and write directions, and a 1-bit ALL_READ field that is 1 if all transfer data has been read, i.e., if LINES_LEFT_TO_READ and OCTETS_LEFT_TO_READ are both 0. Also included are the INT bit and CHAIN bit and the TR_TAG field, and a WAITING_FOR_DRAIN bit. The transaction controller TC writes to these registers. The transaction controller TC, read engine RE and write engine WE all read from these registers.

3 Merge FIFO pointers, an array indexed by transfer #: Each pointer points to one of the 2 write merge FIFOs 57 being used by the current transfer and previous transfer. Each pointer is for a transfer <n> in the range 0, . . . 2; i.e. the value MF[n] is the id, 0-1, of the write merge FIFO 57 used by transfer <n>. The transaction controller TC writes to the pointers; the transaction controller TC, read engine RE, and write engine WE all read from the pointers.

3 TR2TY variables, an array indexed by transfer #: Each variable contains the code of the transfer type for each of the 3 transfers. Codes are in the range 0-2, and are:
CONST_C_0=0
CONST_P_0=1
CONST_NEXT=2.

The transaction controller TC writes the variables; the transaction controller TC, read engine RE, and write engine WE all read the variables.

3 TY2TR variables, an array indexed by transfer type code: Each variable contains the id of the transfer being used by each of the types C_0, P_0, and NEXT. The 3 macros C_0, P_0 and NEXT return the transfer ids of the current, previous and next transfers, and are defined as:
C_0: TY2TR[CONST_C_0]
P_0: TY2TR[CONST_P_0]
NEXT: TY2TR[CONST_NEXT]

The transaction controller TC writes the variables; the transaction controller TC, read engine RE, and write engine WE all read the variables.

A 39-bit parameter block service request register holds either a 32-bit address where the parameter block is located or a 7-bit channel id. This memory is written to by command processor CP.

A 2-bit parameter block in-service register indicates the state of a parameter block read request that is being serviced. One parameter block at a time can be requested. There is a corresponding read-response memory used for assembling the 4 octets of a parameter block, the parameter block data memory. The sequence of operations is:

Command processor CP sends a request by setting the parameter block service request register to an address and setting the parameter block in-service register to 1.

Read engine RE posts a read transaction and sets the parameter block in-service register to 2.

Read response engine RRE indicates that data is ready in the parameter block data memory by clearing the parameter block in-service register to 0.

Command processor CP writes the parameter block data to the transfer memory 45 and signals the deadline engine DE.

2 Write Merge FIFOs: Two write merge FIFOs 57 are provided, each 2 octets wide and 64 slots deep. Read-responses get pushed into these FIFOs by the read response engine RRE, up to 2 FIFOs per cycle; the write engine WE later pops the FIFOs, at most one FIFO per cycle, and generates write transactions upon receiving a Service Request to do so from the transaction controller TC.

For each write merge FIFO, a fullness counter indicates how many data octets there are in the FIFO. These counters are incremented by the read response engine RRE and decremented by the write engine WE, which push and pop data to and from the FIFOs. The transaction controller TC reads one of these counters when generating Write Service Requests to the transaction dispatcher TD. The write engine WE reads the counters when generating transactions. Two read ports are needed for these counters.

Dram Arbiter Database

2 READ_BURST FIFOs, each 16-deep, hold the read transactions of a burst. Each entry contains the transaction address (32-bits), and the #octets to be read (4 bits). One FIFO is for high priority bursts; the other is for low priority bursts. The read engine RE pushes; the DRAM arbiter pops this FIFO.

2 READ_BURST_SIZE FIFOs, each 16-deep, hold the # of transactions in the burst (4-bits), the TR_TAG field (16 bits) and a merge-FIFO/parameter-block id (2-bits). There is one entry in these FIFOs for each burst of entries in the corresponding READ_BURST FIFO. The read engine RE pushes; the DRAM arbiter pops this FIFO.

2 WRITE_BURST FIFOs, each with separate command and data FIFOs, are provided. The data FIFOs are 128-bits wide. The data FIFO has at least 128-octets capacity and holds the write transactions of one or more bursts. A write transaction is a command followed by one or more data octets. A command contains the transaction address (32-bits) and # of data octets in the transaction (4 bits). A data octet contains data. One WRITE_BURST FIFO is for high priority bursts; the other is for low priority bursts. The write engine WE pushes; the DRAM arbiter pops this FIFO.

2 WRITE_BURST_SIZE FIFOs, each 32-deep, hold the # of transactions in the burst (4-bits) and the TR_TAG field (16 bits). There is one entry in these FIFOs for each burst of entries in the corresponding WRITE_BURST FIFO. The write engine WE pushes; the DRAM arbiter pops this FIFO.

A TAG FIFO 65, 16-deep, hold an entry for each read transaction that the DRAM arbiter dispatches to the DRAM controller. Each entry contains the merge-FIFO/parameter-block id (2-bits) and the #octets in the read transaction (4-bits). The DRAM arbiter pushes entries into the FIFO as it dispatches read transactions, the read response engine RRE pops them as the in-order read responses come back.

GBI Arbiter Database

2 GBI_WRITE FIFOs 66 and 67, each 128-bits wide with a 10-octets capacity, and each holding two or more GBI write transactions, are provided. Each entry contains a GBI write command octet followed by 1-4 data octets. One write FIFO 66 is for high priority transactions; the other write FIFO 67 is for low priority transactions. The write engine WE pushes and the GBI arbiter pops these write FIFOs 66 and 67.

2 GBI_READ FIFOs 61 and 62, each 2-deep, holds up to two GBI read transactions. Each entry contains a GBI read command octet. One FIFO 61 is for high priority transactions; the other FIFO 62 is for low priority transactions. The read engine RE pushes and the GBI arbiter pops these read FIFOs 61 and 62.

The Command Processor, Channel Scanner and Transaction Dispatcher Functions

The command processor CP processes incoming transfer commands. It processes a command whenever there is a command in a command FIFO 41, and the channel pool for that priority is non-empty. The command processor CP allocates a channel for the transfer and sets up the transfer in transfer memory 45. The command processor CP also processes transfers with multiple parameter blocks that are chained. When the processing of the current parameter block is complete, the command processor CP updates the transfer in transfer memory 45 using the chained parameter block and the same channel. In both cases, the command processor CP reads the parameter block from memory and writes parameter block information to the transfer memory 45.

The channel scanner CS uses the deadline engine DE to schedule the most urgent transfer (top priority, shortest deadline) in the transfer memory 45, making it the next transfer, providing it differs from all (up to 2) currently executing transfers. If the next transfer needs to preempt a current transfer, deadline engine DE signals preemption. The transaction controller TC will later preempt. Up to 2 transfers can be executing in parallel at any one time—one executing in the "current transfer" slot, and the other executing in the "previous transfer" slot. There is also in general a NEXT transfer awaiting execution when the current slot frees up.

The channel scanner CS uses the transaction controller TC to repeatedly post Read and Write Service Requests to the transaction dispatcher TD to generate data transfer transactions for the current and previous transfers. If the current transfer has completed its reads but not its writes, the transaction controller TC prepares to start the next transfer's reads, thereby overlapping the current and next transfers; the transaction controller TC moves current to previous and then moves next to the just-vacated current.

There is at most one Read Service Request in progress for the current transfer and one for the previous transfer (two in all). However, the transaction controller TC never posts Read Service requests to a previous transfer. There is also at most one Write Service Request for the current transfer and one for the previous transfer (two in all). The transaction controller TC posts Write Service requests to both of them.

A Service Request causes the read and write engines RE and WE to generate either high or low priority transactions, depending on the transfer-priority. The transfer-priority⇒transaction-priority map in the DMA engine control register specifies high or low transaction-priority for each transfer-priority.

The transaction controller TC updates the state of the transfer both in the schedule control registers 47, and in transfer memory 45, whenever it performs a transfer-state transition. When a transfer is complete, the transaction controller TC sets the state of the transfer memory 45 to INACTIVE and restores the channel to the channel pool (deallocates).

The transaction dispatcher TD processes read and write Service Requests from the transaction controller TC, using the read engine RE, read response engine RRE and write engine WE. The read engine RE processes each Read Service Request, generating a burst of read transactions. The read response engine RRE processes incoming read responses, pushing them into a write merge FIFO 57 as they come in. The write engine WE processes each Write Service Request, popping a write merge FIFO 57 and generating a burst of write transactions.

When the data portion of a transfer is complete, the transaction controller TC commands the write engine WE to generate an EOT interrupt if required, at the same transaction priority as the data portion of transfer. This ensures that EOT is notified after all data octets have arrived at their destination, provided that the data destination and interrupt flag go over the same path. The transaction controller TC then either terminates the transfer, or signals the command processor CP to load the next parameter block if the just-finished parameter block is chained.

The read and read response engines RE and RRE also process parameter block fetch requests from the DRAM, as requested by the command processor CP, at high priority. There is at most one such request in progress at any one time.

FIFO Sizing

The sizes of the data FIFOs in the system are based on the following considerations:

- Write Merge FIFOs 57 are 128 bits wide, and hold 128 data octets. This gives sufficient room for four bursts, each having 8 write transactions, each transaction with 4-octets of data, which is the maximum burst size possible going to the GBI. This also gives sufficient room for two bursts, each having 8 write transactions, each transaction with 8-octets of data, which is the optimal transaction size going to DRAM. DRAM bursts of 64 data octets are large enough to provide good page-hit improvements.
- READ_BURST FIFOs 63 and 64 are 16-deep and hold 16 read transactions. This gives sufficient room for two bursts each having 8 read transactions. This is the maximum burst size possible going to the GBI or DRAM.
- READ_BURST_SIZE FIFOs are 16-deep, and hold 16 burst identifiers. This gives sufficient room for the case where 16 read bursts, each with 1 transaction, are pushed into the READ_BURST FIFO 63 or 64.
- TAG FIFO 65 is 16-deep, holding 16 read-transaction identifiers. This gives sufficient room for the case where 16 read bursts, each with 1 transaction, are pushed into the READ_BURST FIFO 63 or 64.
- WRITE_BURST FIFOs to DRAM are implemented as a 16-deep command FIFO 41 and a data FIFO that is 128-bits wide. The data FIFO has a 128-octet capacity and hold the write transactions of a burst. A write transaction is a command followed by one or more data octets. This gives sufficient room for 8 transactions with 8 data octets each (64 octets) and leaves space for another burst.
- WRITE_BURST_SIZE FIFOs 68 and 69 are each 16-deep, and holding 16 burst identifiers. This gives sufficient room for the case where 16 write bursts, each 1 transaction with 1 octet of data, are pushed into a high- or low-priority WRITE_BURST FIFO 68 or 69.
- GBI_WRITE FIFOs 66 and 67 are each 128-bits wide, each 10-octets capacity and each holding two or more GBI write transactions.
- GBI_READ FIFOs 61 and 62 are each 64-bits wide, each 2-deep and each holding two GBI read transactions.

128-Bit Interface for DRAM

The FIFOs that port data to the DRAM and GBI all need to have a 128-bit interface. Furthermore, DRAM write FIFOs 66 and 67 need a parallel command and data FIFO, where the command FIFO 41 is 64 bits wide and the data FIFO is 128 bits wide. This is because DDR2 DRAM operates at 2× clock rate on the (64-bit wide) memory bus, and therefore often reads/writes 16 bytes every 1× clock. The DMA engine runs at 1× clock. Data can be pushed and popped either 128-bits or 64-bits at a time. The FIFOs in question are:
  WRITE_BURST FIFOs.
  WRITE_MERGE FIFOs.

The read response engine RRE pushes read response data from the DDR memory into a write merge FIFO 57, either 128-bits at a time or 64-bits at a time, depending on the number of octets that the GBI or DRAM controller is providing. The write engine WE pops data from the write merge FIFO 57 and pushes into the high- or low-priority GBI/DRAM write burst FIFO 68 or 69, 128-bits at a time. The GBI/DRAM arbiter pops data from the WRITE BURST FIFO 68 or 69 either 128-bits or 64-bits at a time, depending on the number of octets in the write command.

Engine Control Database Implementation

4 Command FIFOs 41:
16 deep, 88-bits wide; hold commands from CPUs
32 bits: parameter block address
56 bits (bits 63:8): FRC timestamp
Pushed by CPU write; popped by CP 4 Channel Pool FIFOs 43:
128 deep, 7-bits wide; hold unused channels
7 bits: unallocated channel id
Pushed by DE; popped by CP 1 Chaining Request Register:
8 bits: channel id (can be NULL)
Written by TC; read/cleared by CP 4 Transfer Counters:
8 bits: # of active transfers (0-128) at each priority
transfer_counter[4]
Incremented by CP; decremented by TC Transfer Memory:
128-deep
STATE—2 bits: inactive/active/interrupting/chaining
PRIORITY—2 bits: 0-3; 0 is top priority
DEADLINE—56-bits: in units of 256 FRC clocks
TOTAL_WRITTEN—29 bits: #octets written so far (updated by WE every write burst)
TOTAL_READ—29 bits: #octets read so far (updated by RE every read burst)
LINES_LEFT_TO_READ—19 bits: 0 to NUM_LINES (updated by RE every read burst)
OCTETS_LEFT_TO_READ—43 bits: 0 to OCTETS_PER_LINE (updated by RE every read burst)
OCTETS_LEFT_TO_WRITE—43 bits: 0 to OCTETS_PER_LINE (updated by WE every write burst)
OCTETS_PER_LINE—43 bits: Bytes per line is always a multiple of 8
NUM_LINES—19 bits
SOURCE—29 bits (updated by RE every read burst)
SOURCE_DELTA—16 bits
DESTINATION—29 bits (updated by WE every write burst)
DEST_DELTA—16 bits
READ_DIR—1 bit: 0—source port is DRAM; 1—source port is GBI
WRITE_DIR—1 bit: 0—destination port is DRAM; 1—destination port is GBI
INT—1 bit: Generate interrupt at EOT
CHAIN—1 bit: Chain to next parameter block at EOT
LOGGING_EN—1 bit: Logging enabled for this transfer
INT_ADDRESS—32 bits
CHAIN_ADDRESS—32 bits: points to next block in chain 1 Scan Request Flag:
1 bit: set by CP, TC; cleared by DE 3 Pairs of In-Service Flags:
One flag pair 53 and 55 for each transfer 0-2
Read_In_Service[3]—1 bit: set by TC on write to read service request register; cleared by RE at service end
Write_In_Service[3]—1 bit: set by TC on write to write service request register; cleared by WE at service end 3 Merge FIFO Pointers:
One for each transfer 0-2
MF—1 bit: point to merge FIFO 0 or 1

Written by TC
3 TR2TY Variables:
One for each transfer 0-2
2 bits: code 0-2 for C_0, P_0, NEXT
Written by TC
3 TY2TR Variables (Inverse of TR2TY Variables):
One for each type C_0, P_0, NEXT
2 bits: value 0-2, a transfer #
Written by TC
Parameter Block Service Request Register:
39 bits: 32 bit address, 7 bit channel id
Written by CP
Parameter Block Data Memory:
4-octets: written by RRE; read by CP
Parameter Block In-Service Register:
2-bits: CP sets to 1; RE sets to 2; RRE clears
2 Write Merge FIFOs:
2-octets wide: 128-octet capacity
Pushed by RRE; popped by WE
2 Write Merge FIFO Fullness Counters:
8 bits: 1 per FIFO, octet counters
1 Logging FIFO:
1-octet wide, 9-octets deep
Pushed by CP, TC; popped by GBI arbiter
Holds logging transactions
3 Sets of Schedule Control Registers:
For C_0, P_0, NEXT
STATE—2 bits: inactive/active/interrupting/chaining
Updated by CP, TC
PREEMPTION_STATE—Used for next transfer only
PREEMPT—1 bit: 0-no preempt; 1-preempt
CHANNEL—8 bits: channel id (can be NULL)
PRIORITY—2 bits: (0-3) id of the command FIFO 41 that requested transfer
DEADLINE—56 bits: used for next, current transfers only
5 Sets of Transfer Control Registers:
For read and write registers 49 and 51 for C_0, P_0, NEXT
TOTAL_READ—29 bits
TOTAL_WRITTEN—29 bits
WRITE_DIR—1 bit
READ_DIR—1 bit
ALL_READ—1 bit: tracks LINES/OCTET_LEFT_TO_READ
INT—1 bit
CHAIN—1 bit
TR_TAG—16 bits: 6 LSBs of tag=> 6 LSBs of subdevice id
WAITING_FOR_DRAIN—1 bit: Set if waiting for DRAM low write burst FIFO 69 to empty so that EOT interrupt can go out
Dram Arbiter Database
2 Read Burst FIFOs:
36 bits, 16-deep: read burst FIFOs 63 and 64 contains DRAM read transactions; entry has a 32-bit address and #octets to be read
READ_BURST_HI 63—High priority; RE pushes, DRAM arbiter pops
READ_BURST_LO 64—Low priority; RE pushes; DRAM arbiter pops
2 Read Burst Size FIFOs:
22 bits, 16-deep: Tracks bursts in the Read Burst FIFO
Entry has # transactions, merge FIFO id, tag
READ_BURST_SIZE_HI—High priority; RE pushes; DRAM arbiter pops
READ_BURST_SIZE_LO—Low priority; RE pushes; DRAM arbiter pops TAG FIFO:
6 bits, 16-deep: Tag FIFO 65 tracks read transactions sent to the DRAM; entry has #octets read, and merge-FIFO id
DRAM arbiter pushes; RRE pops
2 Write Burst FIFOs:
Each write burst FIFO 68 and 69 has 2 component FIFOs: 1 command FIFO and 1 data FIFO, 2-octets wide
128-octet capacity: Contains DRAM write transactions
Entry has an address, #octets to be written followed by data octets
WRITE_BURST_HI 68—High priority; WE pushes; DRAM arbiter pops
WRITE_BURST_LO 69—Low priority; WE pushes; DRAM arbiter pops
2 Write Burst Size FIFOs:
20 bits, 16-deep: Tracks bursts in the Write Burst FIFO 68 or 69
Entry has # transactions, tag
WRITE_BURST_SIZE_HI—Tracks high-priority write burst
FIFO 68; WE pushes; DRAM arbiter pops
WRITE_BURST_SIZE_LO—Tracks low-priority write burst
FIFO 69; WE pushes; DRAM arbiter pops
GBI Arbiter Database
2 GBI Write FIFOs:
2-octet wide, 10-octets capacity: Write FIFOs 66 and 67 contains GBI write transactions; entry is a GBI command octet+1-4 data octets
GBI_WRITE_HI 66—Hi priority; WE pushes; GBI arbiter pops
GBI_WRITE_LO 67—Lo priority; WE pushes; GBI arbiter pops
2 GBI Read FIFOS:
1-octet, 2-deep: read FIFOs 61 and 62 hold GBI read transactions; entry is a GBI command octet
GBI_READ_HI 61—Hi priority; RE pushes; GBI arbiter pops
GBI_READ_LO 62—Lo priority; RE pushes; GBI arbiter pops
Design of the DMA Engine and Subengines
Initialization of Database
All FIFOs are cleared at reset. The 3 sets of schedule control registers 47 are all cleared, except for the channel registers that are set to NULL.
MF[0], MF[1] are set to 0,1 respectively; MF[2] is not initialized.
TY2TR[0], ... TY2TR[2] are set to 0, ... 2 respectively.
TR2TY[0], ... TR2TY[2] are set to 0, ... 2 respectively.
When the channel pool register is written, the command processor CP initializes the four channel pool FIFOs 43, and cycles through the transfer memory 45, setting all states to INACTIVE.
Channel State Transitions and the Effecting Subengine
Inactive⇒Active: Done by CP
Active⇒Interrupting/Chaining/Inactive: Done by TC
Interrupting⇒Chaining/Inactive: Done by TC
Chaining⇒Active: Done by CP
Access to the Memories and Registers of the Database
The transaction controller TC, deadline engine DE, read engine RE, write engine WE, and command processor CP all read from and write to the transfer memory 45. Also, a read of data base information for profiling purposes can be made, from the global bus interface GBI. Actual data readable is defined in the profiling and debugging section.
In order to achieve optimal engine operation, it is necessary for the read engine RE or write engine WE to be able to dispatch one transaction between them to DRAM every two clocks. This allows the DDR2 memory, which has a minimum transaction processing time of 2 cycles (4 2× clock cycles), to operate at full efficiency. The database design should be such that read and write engines RE and WE can operate in this manner almost always. The transfer memory 45 is an arbitrated memory with 1 read/write port. The arbiter should assign priority to engines as follows:

Command processor CP
   Read and write engines RE and WE (round robin)
   Transaction controller TC
   Global bus interface GBI (for debug)
   Deadline engine DE The worst-case utilization of memory is as follows:

CP—0.1
   TC—0.25
   RE—0.25
   WE—0.25

So the global bus interface GBI and deadline engine DE will never be locked out.

The state machines of the engines depend directly on the implementation of the transfer memory 45 and the consequent access-sequence timing. The assumption is that:

Each engine performs reads and writes in any order.
   Each engine has individual read and write, request and grant, RDREQ, RDGRANT, WRREQ and WRGRANT signals.
   Each engine asserts a request REQ (RDREQ or WRREQ) until granted.
   There is a shared read data bus, and individual write data ports for each engine.
   Engine asserts a read request RDREQ and a channel id (address), and receives grant 1+ cycles later.
   The read data is available on the read bus in the same cycle as the grant.
   Engine asserts a write request WRREQ and a channel id (address), and receives grant 1+ cycles later.
   The engine places write data on the write data port in the same cycle as the request, and can remove the data and write request WRREQ only after the grant goes high.

All other database memories and registers have sufficient read and write ports to allow simultaneous access by all engines without arbitration and stall.

Preemption and Parallel Processing of Transfers

Preemption and parallelization of end-of-transfer with start-of-next-transfer are effected using the schedule control registers 47 and transfer registers 49 and 51. There are 3 sets of schedule control registers 47 and 3 sets each of read and write transfer control registers 49 and 51, one set for NEXT, one set for CURRENT and one set for PREVIOUS. The information in the schedule control registers 47 and in the read and write transfer control registers 49 and 51 is duplicated in the transfer memory 45. Transfer memory 45 contains all transfer information of all channels.

The variables TY2TR[0], . . . TY2TR[2] whose indices are CONST_C_0, CONST_P_0 and CONST_NEXT (0, 1, 2 respectively), each contain a transfer id 0-2 that points to the corresponding set of schedule control registers 47 and transfer control registers 49 and 51. The macros C_0, P_0 and NEXT are used to represent TY2TR[0], . . . TY2TR[2]. So C_0, P_0 and NEXT are the transfer ids of the current, previous and next transfers, respectively.

Each of the 3 sets of schedule control registers 47 consists of:

STATE (used by NEXT, CURRENT, PREVIOUS transfers)
   PREEMPTION_STATE (used by NEXT transfer)
   CHANNEL (0-127, can be NULL) (used by NEXT, CURRENT, PREVIOUS transfers)
   PRIORITY (used by NEXT, CURRENT, PREVIOUS transfers)
   DEADLINE (used by NEXT, CURRENT transfers)

The NEXT register set is used for both preemption and end-of-transfer processing. The readiness of a NEXT transfer is indicated by the deadline engine DE setting CHANNEL [NEXT] to non-NULL. The transaction controller TC will later process CHANNEL[NEXT] and set it back to NULL. The deadline engine DE maintains the NEXT register set, updating it with a transfer that is not current or previous, and either will preempt one of the currents or will execute when one of the currents completes or becomes a previous. The NEXT transfer chosen by the deadline engine DE depends on the scheduling algorithm; deadline engine DE also decides if NEXT will preempt or not, and which current transfer will be preempted, by setting values in PREEMPT_STATE[NEXT] and CURRENT_TO_PREEMPT[NEXT].

The transaction controller TC is commanded to perform preemption whenever CHANNEL[NEXT] is not NULL and PREEMPT_STATE[NEXT] is PREEMPT. The transaction controller TC can preempt only if the following condition is true:

if CHANNEL[PREVIOUS] is NULL for the PREVIOUS P_0

The transaction controller TC performs end of transfer processing only if the following condition is true:

if CURRENT transfer has completed posting its read operations (read in service[CURRENT]==0 and ALL_READ[CURRENT]==1) and CHANNEL[PREVIOUS] is NULL for the PREVIOUS channel P_0.

Preemption and end of transfer action by the transaction controller TC is the same, namely:

if (CHANNEL[CURRENT]≠# NULL)
   CURRENT⇒PREVIOUS
   NEXT⇒CURRENT
   NULL⇒NEXT

A transfer in PREVIOUS was either preempted from a CURRENT, or was a CURRENT that completed all its reads. If it was a preempt and still has reads to do even after the current read-in-service completes, it will be removed from PREVIOUS when all previously read data has been written out, and not finish; this is because no new reads are ever issued for a PREVIOUS transfer. If it was a CURRENT that completed its reads it will be removed from PREVIOUS only after it becomes INACTIVE or reaches CHAINING state, i.e., after all data transfer and interrupts are completed.

A CURRENT either completes and is removed directly or is moved to a PREVIOUS (due to a preempt or because it has completed its reads).

Channel Scanner Operation

The command processor loads the transfer memory 45 as transfer commands come in. The contents of the transfer memory 45 drive the channel scanner (or channel sequencer) CS. Channel scanner CS consists of two subengines operating in parallel, namely, the deadline engine DE and the transaction (or transfer) controller TC.

The deadline engine DE scans the transfer memory 45, setting up NEXT schedule and transfer control registers 49 and 51 and checking to see if preemption is needed.

The transaction controller TC processes up to 2 active transfers (1 PREVIOUS, 1 CURRENT), sending read and write service requests to the read and write engines RE and WE. The transaction controller TC does the following:

preempts the CURRENT with NEXT whenever necessary
   processes the CURRENT and PREVIOUS transfers overlaps processing of the CURRENT transfer with the NEXT transfer when reaching the end of a CURRENT transfer The deadline engine DE communicates with the transaction controller TC using the NEXT schedule control registers 47. The deadline engine DE sets NEXT channel to non-NULL when there is a next transfer to process, the transaction controller TC clears it to NULL whenever it moves NEXT to CURRENT.

Deadline Engine Operation

The deadline engine DE scans the transfer memory 45 to update NEXT when the Scan Request Flag is set. Generally, the flag is set whenever a new channel becomes active or the set of channels in CURRENT or PREVIOUS changes. The flag is set
- whenever the command processor CP activates a transfer
- whenever the transaction controller TC moves NULL to NEXT
- whenever the mode is TIMESLICING or HYBRID and the transaction controller TC detects that the current slice has expired
- whenever PREVIOUS completes its reads and writes The deadline engine DE scans the entire memory, examining all non-inactive channels; once a scan is started the deadline engine DE continues to the end even if the transaction controller TC or command processor CP signals a new scan request; such a new scan request will be processed when the current scan finishes. The deadline engine DE identifies the most urgent active transfer other than any CURRENT or PREVIOUS transfers, and places it in NEXT. If preemption is needed, the deadline engine DE signals the fact by setting the preemption state of NEXT to preempt; otherwise it sets it to no-preempt.

If the mode is TIMESLICING, the order of priorities used when comparing 2 transfers is as follows:
- 0, 1, 2, 3 when timeslice 0 is in effect
- 1, 2, 3, 0 when timeslice 1 is in effect
- 2, 3, 1, 0 when timeslice 2 is in effect
- 3, 1, 2, 0 when timeslice 3 is in effect If the 2 priorities are equal, deadlines are also compared.

If the mode is HYBRID, the priority of the transfers is as follows:
- 0, 1, 2, 3 when timeslice 0 is in effect
- 1, 2, 3, 0 when timeslice 1 is in effect The detailed operation of the deadline engine DE to calculate the NEXT transfer is as follows:
- Cycle through transfer memory 45, ignoring any transfers in CURRENT or PREVIOUS, finding the four shortest deadline transfers P0, P1, P2 and P3, at command priorities 0, 1, 2, 3. At the end, set R to be the most urgent among P0, P1, P2, P3. In TIMSESLICING or HYBRID modes, first adjust the priorities relative to the current timeslice priority, as described above. Any of P0, P1, P2 or P3 may get set to NULL. If they are all NULL (i.e., R is NULL), there is nothing more to do.
- If R is not NULL, R$\Rightarrow$NEXT
- If the CURRENT channel is NULL or PREVIOUS channel is not NULL, then no preempt
- If the CURRENT channel is not NULL and the PREVIOUS channel is NULL, then preempt If PREEMPT_STATE[NEXT] is set to PREEMPT by the above, the transaction controller TC will later preempt the CURRENT transfer replacing it by the NEXT transfer.

Transaction Controller Operation

The transaction (or transfer) controller TC generates read and write service requests for active CURRENT and PREVIOUS transfers, and initiates end-of-transfer (EOT) interrupts and chaining as needed. After the read burst of a CURRENT transfer that completes the read portion of the transfer (the transfer is now an ending transfer), the transaction controller TC overlaps write processing of the CURRENT transfer with read processing of the transfer that will follow, in order to optimize utilization of the DRAM. TC also preempts if needed.

The transaction controller TC loops continuously, and in each iteration gives precedence as follows:
- i) if preemption is needed, the transaction controller TC preempts if possible;
- ii) if there is a PREVIOUS transfer that needs write service, TC services it;
- iii) if there is a CURRENT transfer that needs read and/or write service, TC services it.

The transaction controller TC performs end of transfer processing only if the following condition is true:
- if CURRENT transfer has completed posting its read operations (read in service[CURRENT]==0 and ALL_READ[CURRENT]==1) and CHANNEL[PREVIOUS] is NULL for the PREVIOUS channels P_0.

Preemption

If preemption is needed for C_0 (NEXT is not NULL and NEXT preemption state is PREEMPT):
- If CURRENT is NULL the transaction controller TC does:
  NEXT=>CURRENT
  NULL=>NEXT
- If CURRENT is not NULL and PREVIOUS is NULL or PREVIOUS is not using its merge FIFO any longer, the transaction controller TC preempts by:
  CURRENT=>PREVIOUS
  NEXT=>CURRENT
  NULL=>NEXT Note that the transaction controller TC may continue to write-service the preempted transfer (now in PREVIOUS).

Note also that a PREVIOUS read burst initiated when it was CURRENT may still be continuing.

If preemption is not needed or not possible, the transaction controller TC processes PREVIOUS and CURRENT transfers with write service or read service as follows:

Write Service

If a PREVIOUS or CURRENT channel is not NULL and there is no write in-service for it:
- If the state is ACTIVE, the transaction controller TC checks for the conditions below to be true:
  - The write merge FIFO fullness count in fullness counter for the transfer$\geq$32/64 (GBI/DRAM) or
  - TOTAL_READ==TOTAL_WRITTEN+FIFO fullness count and
  - FIFO fullness count is >0 and
    - read service request is 0 and channel is PREVIOUS or
    - ALL READ==1

These conditions indicate that the merge FIFO has enough data for a maximal burst, or that all in-flight read data has arrived at the merge FIFO but not all of it has been written out and that no more reads will be issued. The transaction controller TC then sends a write Service Request to the transaction dispatcher TD by setting the Write_In_Service flag 55.

Otherwise, if the state is ACTIVE, the transaction controller TC checks for the conditions below to be true:
- ALL READ==1 and
- TOTAL_READ==TOTAL_WRITTEN The data portion of the transfer is complete; the transaction controller TC sets the transfer state to INTERRUPTING, CHAINING, or INACTIVE. If setting to INTER- RUPTING, the transaction controller TC sends a write Service Request, setting the Write_In_Service flag 55. If setting to INACTIVE, the transaction controller TC deallocates the channel and restores the channel to the channel pool FIFO 43 from which it was taken and sets the state of transfer memory 45 to INACTIVE. It finally sets PREVIOUS or CURRENT channel to NULL.

If the state is INTERRUPTING, the transaction controller TC sets the state to CHAINING or INACTIVE. If setting to INACTIVE, the transaction controller TC deallocates the channel and restores the channel to the channel pool FIFO 43 from which it was taken and sets the state of the transfer memory 45 to INACTIVE. It finally sets PREVIOUS or CURRENT to NULL.

If the state is CHAINING, the transaction controller TC checks to see if the command processor CP is ready to process a chain command; the transaction controller TC then sends a parameter block fetch request to the command processor CP and sets the state of the transfer memory 45 to CHAINING. It finally sets PREVIOUS or CURRENT channel to NULL.

Read Service

If the transfer is a CURRENT and its state is ACTIVE:
If there is no read Service Request in progress the transaction controller TC checks for:
the number of lines left to read is non-zero or the number of octets left in the line to read is non-zero.
if the difference TOTAL_READ−TOTAL_WRITTEN≦96/64 (GBI/DRAM); this condition guarantees that the write merge FIFO 57 has space for read response data of a burst.

The transaction controller TC sends a read Service Request to the transaction dispatcher TD for the transfer by setting the Read_In_Service flag 53 for the current transfer. It increments the burst count for this timeslice if either the priority of the transfer being serviced is the current timeslice priority or there are no active transfers at the current timeslice priority. When the burst count reaches max, the transaction controller TC signals to the deadline engine DE to start a new scan.

Transaction Dispatcher Operation and the DRAM/GBI Arbiters

The transaction dispatcher TD subengines—read engine RE, read response engine RRE and write engine WE operate as follows:

The read engine RE processes read Service Requests from the PREVIOUS and CURRENT transfers. It gives precedence to the PREVIOUS transfer, and then to the CURRENT transfer. When processing a read Service Request, read engine RE reads the transfer memory 45 of the channel and sends out a burst of read transactions. The maximum allowed number of read transactions posted per Service Request is determined by READ_DIR and the matching MAX_RD parameter; no more than 32/64 octets are ever read at a time (depending on the direction—32 for GBI reads, 64 for DRAM reads). The transaction controller TC sends out a read Service Request only if the write merge FIFO 57 has room for a maximal read burst, so the read engine RE does not need to perform this check.

The read transactions can go either to GBI or DRAM, depending on READ_DIR. The DRAM arbiter grants access to the read engine RE for a complete burst. The GBI arbiter grants access to read engine RE for one read transaction (1 octet). In the case of DRAM, the read engine RE pushes transactions into one of 2 16-deep READ_BURST FIFOs (one high priority, one low priority). If the read engine RE is pushing into the low priority FIFO and there is no room in it and there is a pending hi priority read Service Request, the read engine RE terminates the burst early; otherwise it stalls. The read engine RE tracks the number of transactions it generates in the burst and pushes this number and the channel-id into one of the 16-deep READ_BURST_SIZE FIFOs. The read engine RE does the push into the READ_BURST_SIZE FIFO after all the read transactions of the burst have been pushed into the READ_BURST FIFO. The non-empty state of the READ_BURST_SIZE FIFO is used to signal to the DRAM arbiter that there is a burst ready in the READ_BURST FIFO. The DRAM arbiter later pops the FIFOs. The read engine RE pushes transactions into a GBI_READ FIFO (either high priority 61 or low priority 62), waiting until there is room in the FIFO if necessary. If the read engine RE is pushing into the low priority FIFO 62 and there is no room in it and there is a pending hi priority read Service Request, the read engine RE terminates the burst early; otherwise it stalls.

When processing a parameter block service request, the read engine RE sends out a high-priority 1-deep read burst, comprising a 4-octet read transaction at the address specified, through the DRAM port.

The read engine RE uses a different subdevice id for read transactions depending on the merge-FIFO/parameter-block-buffer that the read response data goes to. Subdevice ids (8-bits) are constructed by concatenating the 6 LSBs of the transfer tag identifier in the parameter block, and 2 bits corresponding to the 2 write merge FIFOs 57 being used (0-1) and a parameter block fetch (2). The read and read response engines RE and RRE distinguish between 3 different ids. The 2 bit field of each subdevice id is later used to demultiplex read responses and push them into the merge FIFO allocated to the channel being serviced, or into the parameter block data buffer 59.

The read response octets coming in to the memory subsystem through the global bus interface (i.e. transfers from local memory to DRAM) carry with them the 8-bit subdevice id. But read responses from the DRAM do not. Read responses from the DRAM are assumed to come back in the order in which the read transactions were sent; therefore the DRAM arbiter maintains a 16-deep 7-bit wide tag FIFO 65 into which it pushes the 2 bit field of the subdevice-id of each read transactions going to the DRAM (0-2), and in parallel also the transaction size in octets (1-8) for each transaction. The read response engine RRE routes each read response octet to its destination merge-FIFO/parameter-block-buffer as it comes back depending on the 2-bit subdevice-id field at the top of the tag FIFO 65. The read response engine RRE pops the tag FIFO 65 to get a new subdevice-id/transaction-size whenever it completes receiving the responses for the previous DRAM read transaction.

The read engine RE starts processing the next read Service Request and generates the next set of read transactions, possibly before the read responses of the previous read transactions have arrived. So, in principle, there can be up to 2 channels' read responses being processed in parallel by the read response engine RRE at any one time. The read engine RE updates the transfer control TOTAL_READ register 49 when sending out each transaction of the burst. After sending the last read transaction of a burst the read engine RE also updates transfer memory 45 and then clears the Read_In_Service flag 53, terminating the read Service Request. In parallel, the read response engine RRE processes each read-response as it comes in from the GBIs or the DRAM controller, pushing it into the merge FIFO of the channel it belongs to, or into the parameter block data buffer.

The read response engine RRE assembles read-responses and pushes them into the merge FIFO for the channel, or into the parameter block data buffer, corresponding to the 2-bit field of the subdevice id. The FIFO merges the read responses, so that as many write transactions as possible are 4-octet or 8-octet transactions, and also so that there can be bursts of write transactions.

For each read Service Request, there are typically several read transactions generated. For each write Service Request there are typically several write transactions generated. When the transaction controller TC detects that at least 32/64 octets of data have accumulated in the Write Merge FIFO 57 (depending on the write direction—32 for GBI writes, 64 for DRAM writes), or that all remaining transfer data has accumulated in the FIFO, it sends a write Service Request to the transaction dispatcher TD.

The write engine WE processes write Service Requests from the PREVIOUS and CURRENT transfers. It gives precedence to the PREVIOUS transfer, and then CURRENT transfer. The write engine WE first reads the transfer memory 45 for the channel. The write engine WE updates the transfer control TOTAL_WRITTEN register 51 after every transaction. When the write engine WE has sent MAX_WR number of write transactions, or the merge FIFO has fewer octets than the next write transaction needs, the write engine WE updates transfer memory 45 and terminates the write Service Request by clearing the Write_In_Service flag 55. The write transactions can go either the GBI or DRAM, depending on WRITE_DIR. The DRAM arbiter grants access to the write engine WE for a complete burst. The GBI arbiter grants access to write engine WE for one write transaction.

In the case of DRAM, the write engine WE pushes (multi-octet) transactions into one of 2 128-octet WRITE_BURST FIFOs (one high priority, one low priority), waiting until there is room in it if necessary. Each transaction has an address, a count of data octets, and 1 to 8 data octets. Also, the write engine WE tracks the number of transactions in the burst, and pushes this number into one of 2 16-deep 20-bit wide WRITE_BURST_SIZE FIFOs when the last data octet of the last transaction in the burst is pushed in. The DRAM arbiter uses the non-empty state of the WRITE_BURST_SIZE FIFO to indicate that there is a burst ready for it to write to DRAM. The DRAM arbiter later pops the FIFOs.

In the case of GBI, the write engine WE pushes transactions into an outgoing GBI_WRITE FIFO (choosing either high priority FIFO 66 or low priority FIFO 67).

If pushing into a lo-priority FIFO 67 and there is no room in it for the next transaction and there is a pending hi priority write service request, the write engine WE terminates the burst early; otherwise it stalls.

The read and write engines RE and WE contend for the DRAM controller, as does the normal access block NAB 21 (FIG. 1). The read and write engines RE and WE contend for the outgoing global bus interface, as do outgoing read-responses (from NAB reads or reads of an memory subsystem register). Two arbiters, the DRAM arbiter and the GBI arbiter give grants.

The DRAM arbiter is a 6-way arbiter, arbitrating between high priority and low priority FIFOs in the normal access block NAB 21, and high-priority and low-priority read and write BURST FIFOs 63, 64, 68 and 69 in the DMA engine. For maximum efficiency the DRAM arbiter provides a grant to the DMA engine for the duration of a complete burst. The NAB FIFOs may also be given grants in bursts, to allow a better balance to be achieved between NAB and DMA bandwidth.

Read and write engines RE and WE assert a request to the DRAM arbiter when any of the READ_BURST_SIZE or WRITE_BURST_SIZE FIFOs are not empty. The arbiter processes the transactions of a read burst one by one, if there is enough room in the tag FIFO 65 for each individual transaction of the burst; it may rearbitrate in the middle of a burst if the tag FIFO 65 is too full, though this should not happen. The normal access block NAB 21 asserts a request to the DRAM arbiter when one or both of the incoming RWC FIFOs have one or more complete transactions in them. The DRAM arbiter gives grants to high priority requests on a round robin basis. If there are no high priority requests, the DRAM arbiter gives grants to low priority requests on a round-robin basis.

The GBI arbiter is a multi-way arbiter, arbitrating between outgoing read and write engines RE and WE originated high and low priority read and write transactions, read responses from processor-originated memory subsystem register reads, outgoing hi priority logging transactions, and NAB-originated outgoing read-responses feeding into the global bus interface. The GBI arbiters provide a grant for the duration of a transaction. The read and write engines RE and WE assert a request to a GBI arbiter when an outgoing read transaction has been assembled in a GBI_READ FIFO 61 or 62 or the command octet of a write transaction has been written to a GBI_WRITE FIFO 66 or 67. The data octets are guaranteed to follow on the next cycles. The GBI arbiters give grants to outgoing read-responses first, then to logging, then to read and write engine RE and WE hi-priority transactions on a round robin basis, and lastly to read and write engine RE and WE lo-priority transactions on a round robin basis.

Performance Considerations

A deadline engine DE scan of a 128 channel-system scans 1 channel per cycle and provides a new NEXT every ~430 cycles. But the average transfer may take less, e.g., 80 cycles (for a 720 pixel 2-byte-per pixel video line) or 25 cycles (for an 8-line macroblock with up to 64 bytes per line).

If a significant proportion of transfers take considerably less time than a deadline engine DE scan, the DRAM will be idle for a significant proportion of the time. To prevent this from happening, the deadline engine DE scan operation can be modified to calculate multiple NEXT transfers every scan. The transaction controller TC starts one of them whenever CURRENT becomes NULL, restarting deadline DE scan to replenish that NEXT at the same time. Alternately, the number of channels can be reduced from 128, shortening the time the deadline engine DE needs for a scan.

Command Processor Operation

The command processor CP monitors the 4 command FIFOs 41 in priority order for incoming commands. When the command processor CP detects an incoming command it allocates a channel to it from the pools and reads its parameter block. The command processor CP also performs chaining of chained parameter blocks when commanded by the transaction controller TC through the Chaining Request Register. After reading the parameter block, the command processor CP updates transfer memory 45. The command processor CP then signals the deadline engine DE to scan the transfer memory 45 and recalculate NEXT, by setting the Scan Request Flag. The command processor CP also logs start-of-transfer and parameter block start times if logging is enabled. The command processor CP uses the following scratch registers: PR, CH, deadline, count, chaining, P0_size, P1_size, P2_size, and P3_size. The command processor CP may have any of the following states:

CP state==INIT: Wait for CPU to write to channel pool register then initialize registers After the channel pool register has been written to, registers are initialized as CH=0, MF[0]=0, MF[1]=1, CHANNEL [0] . . . CHANNEL[2]=all NULL, TR2TY[0]=CONST_C_0, TR2TY[1]=CONST_P$_{-o}$, $_{TR}$2TY[2]=CONST_NEXT, TY2TR[CONST_C_0]=0, TY2TR[CONST_P_0]=1, TY2TR [CONST_NEXT]=2, priority_0 . . . priority_3 channel pool FIFOs 43 all reset, P0_size=P0_size_reg, P1_size=P1_size_reg, P2_size=P2_size_reg, P3_size=P3_size_reg, and Chaining Request Register=NULL.

The command processor CP is then set to the INIT_POOL state.

CP state==INIT_POOL: Initialize the 4 channel pool FIFOs 43

The size of the channel pool FIFOs 43 are successively checked, beginning with priority 0, and the first one found to be not empty (size≠0) causes the sequence: push CH⇒priority_i channel pool FIFO, CH++, and Pi_size—(where i is 0 . . . 3), else if all of the FIFOs are empty, then CH=127.

The command processor CP is then set to the INIT_MEMORY state.

CP state==INIT_MEMORY: Initializes transfer memory 45

This state sets all command processor STATE fields to inactive (IDLE), if write memory access is granted and CH==0. If CH≠0, then it causes CH−. If write memory access is not granted, then it causes a request write to transfer memory 45, then address CH:.

The command processor CP state is then set to IDLE.

CP state==IDLE: Reinitializes pool or chains to next parameter block or checks for commands If the system is idle (command FIFOs 41 are empty, and the chaining request register and transfer counters are all null) and if the CPU has updated (written to) the POOL register, then this IDLE state causes the 4 channel pool FIFOs 43 to be reset. If the chaining request register is not null, then the chaining request is processed (CH=CHAINING_REQUEST_REGISTER and CP_state=CHAINING) by reading the parameter block.

The CP state is then set to COMMANDS.

CP state==COMMANDS: Checks for commands in command FIFOs 41 to process and allocates a channel to highest priority command Command FIFOs 41 are checked successively beginning with the highest priority Command_FIFO_0. Once a non-empty command FIFO 41 is found, channels are checked successively beginning with the highest priority channel pool not higher than the corresponding command FIFO 41. (For example, if command_FIFO_1 is the first non-empty command FIFO 41 found, then channel pool P0 is skipped and the search for an available channel begins with channel pool P1.) When a channel is found for a command, the command is popped from its command FIFO 41 into address and deadline words of the parameter block, the value of the channel pool P0 . . . P3 is popped into the scratch register CH, and if the channel pool is different from that corresponding to the command FIFO 41, the POOL_TOO_SMALL bit in the DMA engine status register is set. The CP state is then set to PB_FETCH. If no commands are found in any of the command FIFOs 41, the CP state is set to IDLE.

CP state==CHAINING: Read from transfer memory 45 to get chain address and deadline of next parameter block In the chaining state, a request to read from the transfer memory 45 is issued. When read memory access is granted, the chain address and deadline are loaded from location [CH] of the transfer memory 45 into the address and deadline words of the parameter block.

The command processor CP is then set to the PB_FETCH state.

CP state==PB_FETCH: Send parameter block service request to RE engine in TD

In the PB_FETCH state, address and CH are written into PARAMETER_BLOCK_SERVICE_REQUEST and the parameter block in-service register is set to 1.

The command processor CP state is then set to WAITING.

CP state==WAITING: Waiting for parameter block data to arrive from RRE engine in TD for writing to memory While waiting for parameters to arrive (i.e., while parameter block in-service register==0), the address of the next parameter block is calculated in case chaining will be needed. This calculated next address is written to transfer memory 45 to be used for the next block. If SOT logging or CMD logging is enabled for this transfer, the command processor CP is set to the LOGGING state. If logging is not enabled and this parameter transfer is the first block in a chain, deadline to be used for the second and later blocks of the parameter transfer is calculated and written to transfer memory 45.

The command processor CP state is then set to WRITING_MEMORY.

CP state=WRITING_MEMORY: Writing parameters to transfer memory 45

In this state, the command processor CP updates transfer memory 45 by asserting a write access at address CH of the transfer memory 45, then issuing the parameter block data for writing to the transfer memory 45 (with the following settings: address⇒NEXT_CHAIN, calculate quad to use⇒QUAD, UNASSIGNED⇒GBI_TO_USE, deadline⇒DEADLINE, and ACTIVE⇒STATE). There is no need to wait for a write grant from the transfer memory 45, since the command processor CP has top priority. This allows the command processor CP to always complete a write in 1 cycle. The Scan Request Flag is set to 1, so as to signal the deadline engine to scan. The count of priority_0 transfers (transfer_counter[PR]) is incremented if not chaining. The command processor is then set to the IDLE state.

CP state=LOGGING: Writing command-received, start-of-transfer into log

In the LOGGING state, command-received (CMD) or start-of-transfer (SOT) logging is enabled if the logging FIFO is not in use by other engines and there is room in the logging FIFO for a transaction. The command processor may wait for room in the FIFO, if necessary. The logging FIFO is hi priority. If CMD logging is enabled, logging data (channel, tag, deadline, RECEIVED) is pushed into the FIFO. If SOT logging is enabled, the logging data (channel, tag, deadline+deadline−delta, START) is pushed into the FIFO. In either case, logging the deadline is decremented by delta (the number of time units required for logging). The command processor CP is then set to the WRITING_MEMORY state.

Deadline Engine Operation

The deadline engine scans transfer memory 45, finding the next transfer. The deadline engine DE and transaction controller TC share the scratch registers timeslice and ts_priority. The deadline engine DE also uses scratch registers DE_state, channel, new_channel, state, priority, and deadline, as well as sets of scratch registers ST[4], CH[4], and DL[4], 1 per command priority. One of these sets will be the most urgent at end of scan. The sets of 4 variables with same index are called P0, P1, P2, P3. Scratch registers next_t and next_preempt_state are calculated at end of scan. Register next_t points to 1 of P0, . . . P3. All priority registers contain a command priority.

DE has the following 4 states:

DE state==IDLE: Wait for signal to scan the transfer memory 45

In the IDLE state, the Scan Request Flag is reset to 0 to avoid a potential conflict with a write of 1 into transfer memory 45 (which takes precedence). The deadline engine waits before scanning transfer memory 45. Certain scratch register values are initialized: channel=0, new_channel=NULL, and CH[0] . . . CH[3]=all NULL. The deadline engine is set to the SCAN state.

DE state==SCAN: Scan 128 channels, calculate candidates P0, P1, P2, P3, for next_t In the SCAN state, the deadline engine DE scans the 128 channels with a pipeline read of the transfer memory 45, reading STATE, DEADLINE, and PRIORITY for each channel and comparing the current channel information against the earlier ones for changes (channel≠CHANNEL[C_0] & channel≠CHANNEL[P_0]), and updating the P0, . . . P3 entries in the scratch register arrays CH, DL and ST as needed (ST[priority]=state, DL[priority]=deadline, and CH[priority]=new_channel).

After scanning all channels, the deadline engine DE is set to the CALCULATE state.

DE state==CALCULATE: Calculate next transfer+need to preempt

In the CALCULATE state, the deadline engine DE calculates the values of next_t (=CALC_R if CH[CALC_R]≠NULL) and next_preempt_state (=NO_PREEMPT if current transfer NULL, =PREEMPT if current transfer is active and R>T) values. The macro function CALC_R calculates the most urgent transfer request (GET_CMD_PR[priority]) among P0, . . . P3.

The deadline engine DE is then placed in the UPDATE state.

DE state==UPDATE: Update NEXT schedule control and transfer control registers 47, 49 and 51

In the UPDATE state, the deadline engine DE reads next_t from transfer memory 45, and if next_t is not equal to one of NEXT, CURRENT or PREVIOUS, updates the NEXT schedule control registers 47 and the NEXT transfer control registers 49 and 51 (STATE⇒STATE[NEXT], DEADLINE⇒DEADLINE[NEXT], TOTAL_READ⇒TOTAL_READ[NEXT], TOTAL_WRITTEN⇒TOTAL_WRITTEN[NEXT], READ_DIR⇒READ_DIR[NEXT], WRITE_DIR⇒WRITE_DIR[NEXT], INT⇒INT[NEXT], CHAIN⇒CHAIN[NEXT], CHANNEL[NEXT]=CH[next_t], PREEMPT_STATE[NEXT]= next_preempt_state, PRIORITY[NEXT]=PR[next_t], and move 1⇒ALL_READ[NEXT] if both LINES_LEFT_TO_READ and OCTETS_LEFT_TO_READ are zero, otherwise move 0⇒ALL_READ[NEXT]).

The deadline engine is then put into the IDLE state.

Transaction Controller Operation

The transaction controller TC performs updates of CURRENT and PREVIOUS when NEXT is non-NULL and when CURRENTs complete their read-bursts. The transaction controller TC preempts if necessary. The transaction controller TC also posts read and write service requests to the read and write engines RE and WE, and coordinates end-of-transfer interrupts and chaining. The transaction controller TC uses the following scratch registers: TC_state, channel, TR, max_wr_burst_octets, max_rd_burst_octets, and completing. Scratch register TR is one of C_0, P_0, NULL. The transaction controller TC has one of the following states:

TC state==IDLE: See if preempt required, otherwise process previous and current

If priority 0 channel is null and the next channel is not null, the transaction controller TC is set to the NEXT2CURRENT state. If preemption was signaled, the transaction controller is then set to the PREEMPT state. Otherwise, if there is a NULL previous or a previous that completed using its merge FIFO, the transfer memory 45 is up-to-date for such a previous, so no memory update is needed, and the transaction controller TC is set to NEXT_TRANSFER.

TC state==NEXT2CURRENT: Move next to a NULL current

In the NEXT2CURRENT state, the transaction controller sets next channel to NULL, where current is NULL. The scan request flag is set to 1 to signal a deadline engine DE scan, and then the transaction controller state returns to IDLE.

TC state==PREEMPT: Preempt current with next

In the PREEMPT state, the transaction controller TC cycles current into the previous channel, next into the current channel, and previous into the next channel, then sets the next channel to null. Thus, the current channel has been preempted with next transfer, while the preempted current transfer has been placed in the next channel for later completion. The scan request flag is set to 1 to signal a deadline engine DE scan, and then the transaction controller TC returns to the IDLE state.

TC state==NEXT_TRANSFER: Cycle thru P_0, C_0

In the NEXT_TRANSFER state, the transaction controller TC, after first checking the completion status of any current transfer (and going to the COMPLETE_TRANSFER state if the transfer is not yet completed), sequences to the next non-NULL transfer it finds, beginning with CHANNEL[P_0] then CHANNEL[C_0]. The transaction controller TC state is set to SET_MAX_BURST_SIZES. If it finds no non-NULL transfer to process, it returns to the IDLE state.

TC state==SET_MAX_BURST_SIZES: For read and write, calculate max read and write burst sizes in octets, depending on DRAM/GBI directories In the SET_MAX_BURST_SIZES state, the transaction controller TC reads from the DRAM or GBI directory, as specified by the transfer request, to obtain and set the maximum burst size of the read or write transaction. The state is then set to PROCESS_P_AND_C.

TC state==PROCESS_P_AND_C: No preemption, so process previous and current transfers The transaction controller TC, when in the PROCESS_P_AND_C state, entered only if there is a transfer request TR, processes one of the P_0 and C_0 transfers. If write service is needed, i.e., there is data to write, including from any previous uncompleted write transfers, the data is written until the transfer is complete. The deadline engine DE is then signaled to scan. If there is data to read and there is room in the merge FIFO, then a read service request is sent.

In timeslicing mode, the slice count is incremented if either the current transfer's priority equals the current timeslice priority or there are no active transfers at the current timeslice priority. If the timeslice value is greater than the allotted timeslice, the transaction controller goes to the next slice (ts_priority++) and the deadline engine DE is signaled for a deadline scan.

Completion status is checked before moving to a next transfer. The transaction controller TC is then set to the COMPLETE_TRANSFER state.

TC state==COMPLETE_TRANSFER: Send out interrupts and chaining if needed; and clean up at end by deallocating the channel if not chaining In the COMPLETE_TRANSFER state, the transaction controller TC checks if there is an active interrupt or chaining transaction request (STATE[TR]=ACTIVE, and INT[TR]=1 or CHAIN[TR]=1), and if so, initiates an interrupt or chaining transaction (STATE[TR]=INTERRUPTING or STATE[TR]=CHAINING, and for chaining CHAINING_REQUEST_REGISTER=CHANNEL[TR]). The transaction controller TC is set to the WRITE_MEMORY state to update the state in the transfer memory 45. Likewise, if already interrupting (STATE[TR]=INTERRUPTING), the transaction controller TC checks to see whether the interrupt has been dispatched (Write_In_Service[TR]=0), and if so, chaining is initiated if needed (CHAIN[TR]=1). If chaining is not required, the transaction controller TC is set to the NEXT_TRANSFER state. Once a transfer is complete (STATE[TR]=INACTIVE), memory is up-to-date, so current and previous are freed up and CHANNEL[TR]=NULL. The transaction controller is set to the NEXT_TRANSFER state.

TC state==WRITE_MEMORY: Update state in memory and restore channel to pool at end of chain In the WRITE_MEMORY state, the transaction controller TC requests a write to the transfer memory 45 at address CHANNEL[TR], if write access has not been granted, updating the memory state with STATE[TR]. Once write access is granted, the transaction controller TC deallocates the channel when STATE[TR] is inactive, decrementing the count of priority 0 transfers. The transaction controller TC enters the NEXT_TRANSFER state.

TC state==LOGGING: Sending end-of-transfer transaction to log

In the LOGGING state, the transaction controller TC pushes the end-of-transfer logging data (channel, tag, timestamp, END) into the logging FIFO, waiting for room if necessary. The logging FIFO is high priority, and this logging data transfer may be a multi-cycle operation. When the transfer is complete, the memory is up-to-date, so current or previous is freed up (CHANNEL[TR]=NULL) and the transaction controller TC is set to the NEXT_TRANSFER state.

Transaction Dispatcher Operation

The transaction dispatcher TD has 3 subengines—a read engine RE, a read response engine RRE and a write engine WE. Also included are the DRAM arbiter and GBI arbiter.

Read Engine Operation

The read engine RE uses the scratchpad registers: RE_state, CH, TR, max_rds, address, delta, lines_left, octets_left, octets_per_line, transaction_size, and transaction_count. The read engine RE uses the TRANSFER_PRIORITY⇒TRANSACTION_PRIORITY map in the DMA engine control register, TRANS_PR[4]. The read engine has the following states:

RE state=IDLE: Ready to process Service Requests from TC or CP.

In the IDLE state the read engine RE processes new read service requests, giving priority to parameter block service requests (parameter block in-service register=1), then read requests among previous transaction requests (Read_In_Service[P_0]=1), then read requests among current transaction requests (Read_In_Service[C_0]=1). The scratch pad register CH is loaded with the channel id of the channel being initiated in the case of parameter block request, or with CHANNEL[P_0] or CHANNEL[C_0] in the case of previous or current requests. The scratch pad register TR is loaded with P_0 or C_0 in the case of previous or current read requests. For parameter block in-service requests, the read engine is next set to the READING_PARAMETERS state, while in the case of previous or current request, it is set to the READING_MEMORY state.

RE state=READING_PARAMETERS: Processing a read transaction for a parameter block In the READING_PARAMETERS state, the read engine RE posts a high priority read transaction to read a parameter block (push read transaction (parameter block address, 4) ⇒READ_BURST_HI FIFO; push (burst_size=1, CH) ⇒READ_BURST_SIZE_HI FIFO; set parameter block in-service register to 2). The transaction stalls if the READ_BURST_HI FIFO is full and the stall counter is incremented. After reading a parameter block the read engine RE returns to the IDLE state.

RE state=READING_MEMORY: Reading transfer memory 45

In the READING_MEMORY state, the read engine RE requests memory access if a read memory access has not been granted, then reads transfer memory 45 (SOURCE⇒address, SOURCE_DELTA⇒delta, LINES_LEFT_TO_READ⇒lines_left, OCTETS_LEFT_TO_READ⇒octets_per_line, and transaction_count=0) and sets up the maximum number of reads for this burst (either max_rds=MAX_RD_GBI or max_rds=MAX_RD_DRAM, depending on the setting of READ_DIR[TR]). The read engine RE state is set to BURSTING.

RE state=BURSTING: Bursting read transactions

In the BURSTING state, the read engine RE does a read burst from DRAM or through the global bus interface GBI, pushing rd(address, transaction_size) into the appropriate FIFO (READ_BURST_HI, READ_BURST_LO, GBI_READ_HI, or GBI_READ_LO) and using the scratch register transaction_count to track progress of the burst relative to the value in max_rds that had previously been set up. The read engine RE state goes to UPDATE to increment the transaction count. The read burst terminates early if a high priority read request is pending on another channel (TRANS_PR[PRIORITY[C_0]]=1 or TRANS_PR[PRIORITY[P_0]]=1) and the low priority read burst FIFO (READ_BURST_LO) 64 is full. If an early termination is called for, the burst progress is stored (address⇒SOURCE; lines_left⇒LINES_LEFT_TO_READ; octets_left⇒OCTETS_LEFT_TO_READ; TOTAL_READ[TR]=⇒TOTAL_READ). At the end of a burst, the read engine RE state returns to IDLE.

RE state=UPDATE: Updating burst variables each transaction

In the UPDATE state, the read engine RE updates buffer variables and the scratchpad registers (increment transaction_count; update lines_left, octets_left, TOTAL_READ[TR], ALL_READ[TR], and address) using transaction_size. The read engine RE state returns to BURSTING at the conclusion of the updates. This state can be folded into BURSTING if timing allows.

RE state=WRITING_MEMORY: Updating transfer memory 45 at end of burst

In the WRITING_MEMORY state, the read engine RE updates the transfer memory 45 read state after a burst (address⇒SOURCE; lines_left⇒LINES_LEFT_TO_READ; octets_left⇒OCTETS_LEFT_TO_READ; TOTAL_READ[TR]⇒TOTAL_READ) and also uses this memory access to update GBI_TO_USE (Read_In_Service[TR]=0) in the transfer memory 45 so as to terminate the service request. The read engine RE state then returns to IDLE.

Read Response Engine Operation

The read response engine RRE processes read-responses from DRAM and GBI in parallel. It processes DRAM read requests, one every cycle, and GBI read requests, one every cycle. Each DRAM read request is either 1 octet or 2 octets. It pushes read requests into write merge FIFOs 57 or into the parameter block data buffer 59. It is guaranteed that DRAM and GBI read requests go to different merge FIFOs. Each read response comes with a tag in a tag FIFO 65 containing the 2 most significant bits of the subdevice-id of the original read. This subfield of the subdevice id is the identification for the write merge FIFO 57 that the read request is to be pushed into, or an identification indicating that the read request data is parameter block data for buffer 59. The read request engine RRE uses the following scratch registers: ready_to_push, dram_octet_counter, gbi_octet_counter, dram_WMF, gbi_WMF, and octet.

Write Engine Operation

The write engine WE processes data in the write merge FIFOs 57 and generates write transactions. Up to 64 octets can be processed per burst. The write engine WE uses the following scratchpad registers: WE_state, CH, TR, transaction_count, transaction_size, priority, max_wrs, current_rr, previous_rr, address, delta, octets_left, octets_per_line, and octets (a 128-bit buffer). The write engine WE uses the TRANSFER_PRIORITY ⇒TRANSACTION_PRIORITY map in the DMA engine control register, TRANS_PR[4]. The write engine WE has the following states:

WE state=IDLE: Ready to process Write Service Requests from transaction controller TC In the IDLE state, the write engine WE starts processing a new write service request, giving priority to PREVIOUS transfer requests (Write_In_Service[P_0]=1, TR=P_0, CH=CHANNEL[P_0], priority=TRANS_PR [PRIORITY [P_0]]) and then CURRENT transfer requests (Write_In_Service[C_0]=1, TR=C_0, CH=CHANNEL[C_0], priority=TRANS_PR[PRIORITY[C_0]]) from the transaction controller TC. The write engine WE is then set to the READING_MEMORY state.

WE state=READING_MEMORY: Reading transfer memory 45

In the READING_MEMORY state, the write engine WE requests read access to the transfer memory 45, and once read access is granted, reads into the scratch registers (DESTINATION or INTERRUPT_ADDRESS⇒address; DESTINATION_DELTA⇒delta; OCTETS_LEFT_TO_WRITE⇒octets_left; OCTETS_PER_LINE⇒octets_per_line) and sets up the maximum number of write octets in this burst (max_wrs=either MAX_WR_DRAM or MAX_WR_GBI, depending on the write directory for this transfer request). If the transaction is bursting, the read destination is read into the address and the write engine WE enters the BURSTING state. If instead the transaction is generating an interrupt (STATE [TR]=INTERRUPTING), the interrupt is read into the address and the write engine WE enters the WAIT_EOT state.

WE state=BURSTING: Bursting write transactions

In the BURSTING state, the write engine WE generates a burst of write transactions to DRAM or through the global bus interface GBI, sending a command octet then data octets for each transaction. The write engine WE pushes wr(address, transaction_size) into the appropriate FIFO (WRITE_BURST_HI, WRITE_BURST_LO, GBI_WRITE_HI, or GBI_WRITE_LO). For each transaction of the burst, push write transaction command octet into appropriate FIFO, then pop merge FIFO[MF[TR]]=> octets and set write engine state=DATA for posting the data octets. Burst transactions should be optimal (the appropriate FIFO should have room for the burst transaction), else residual data could be left in the FIFO. The write engine WE uses the scratch register transaction_count to track progress of the burst relative to the value in max_wrs that had previously been set up. The write burst terminates early if the low-priority write burst FIFO (WRITE_BURST_LO) 69 is full and a high priority burst is pending on another channel (TRANS_PR [PRIORITY [C_0]]=HI or TRANS_PR[PRIORITY[P_0]]=HI). If an early termination is called for, the burst progress is stored (address⇒DESTINATION; octets_left⇒OCTETS_LEFT_TO_WRITE; TOTAL_WRITTEN [TR]⇒ TOTAL_WRITTEN). At the end of a burst, the write engine WE state returns to IDLE.

WE state=DATA: Dispatching data octets

In the DATA state, the write engine posts transaction data octets to the appropriate FIFO (WRITE_BURST_LO, WRITE_BURST_HI, GBI_WRITE_LO, GBI_WRITE_HI) according to the priority (LO or HI) and the value of the write directory WRITE_DIR[TR] for that transaction (DRAM or GBI). For each octet of the data burst, pop merge FIFO [MF[TR]]⇒octets, then push write transaction data octet into the appropriate FIFO. The scratch register octets_left and the value TOTAL_WRITTEN[TR] are updated to keep track of the data burst progress. When the data octets have been posted, the transaction_counter is incremented and the write engine WE returns to the BURSTING state for the next write transaction in the burst.

WE state=WRITING_MEMORY: Updating transfer memory 45 at end of burst

In the WRITING_MEMORY state, the write engine WE requests write access to transfer memory 45, and when granted updates the transfer memory 45 after each burst with address⇒DESTINATION, octets_left⇒OCTETS_LEFT_TO_WRITE, and TOTAL_WRITTEN [TR]⇒TOTAL_WRITTEN. It then terminates the service request (Write_In_Service[TR]=0) and returns to the IDLE state.

WE state=WAIT_EOT: Wait for all DRAM data to leave DMA to guarantee data/INT order In the WAIT_EOT state, the write engine WE waits for all transfer data to be written out to the DRAM or global bus interface (GBI), that is, for the end of the transfer when the appropriate FIFO involved in the data transfer becomes empty. The write engine WE state is then set to INTERRUPT. If stalling on a low-priority interrupt and the high-priority write service request is pending, then the low-priority interrupt is terminated early, a flag (WAITING_FOR_DRAIN [TR]) is set to prevent further pushes into the DRAM LO FIFO, and the write engine goes to the IDLE state.

WE state=INTERRUPT: Generate interrupt

In the INTERRUPT state, the write engine WE sends an interrupt through the global bus interface GBI. The write transaction request for the specified interrupt address is pushed through either the GBI_WRITE_HI or GBI_WRITE_LO FIFO, depending on priority and provided there is room for the transaction in the relevant FIFO. The write engine WE is then set to the INTERRUPT_DATA state. As in the WAIT_EOT state, if stalling on a low-priority interrupt and the high-priority write service request is pending, then the low-priority interrupt is terminated early and the write engine goes to the IDLE state to prepare for the high-priority request.

WE state=INTERRUPT_DATA: Dispatching interrupt data octet and terminating transfer In the INTERRUPT_DATA state, the write engine WE pushes the interrupt data octet through the global bus interface GBI via the appropriate priority GBI write FIFO 66 or 67. It then terminates the service request and returns to the IDLE state.

The invention claimed is:

1. A direct memory access (DMA) engine processing transfer requests of a data processing system, comprising:
a command processor adapted to receive and interpret transfer requests of the data processing system;
a transaction dispatcher having read, read response, write engines adapted to handle command and data octet transfers through a set of FIFO registers to and from a DRAM controller and a global bus interface in accord with transfer requests interpreted by the command processor; and a channel scanner having a deadline engine and a transaction controller, the deadline engine adapted to determine a transfer urgency, and the transaction controller adapted to schedule among multiple transfer requests interpreted by the command processor based on the determined transfer urgency of the respective transfer requests so as to control the engines of the transaction dispatcher, wherein the transfer urgency is based on both a transfer deadline and a transfer priority, such that higher priority transfers have higher urgency, and equal priority transfers with earlier deadlines have higher urgency, and wherein the transfer priority is based on a hardness representing a penalty for missing a deadline and is also assigned to zero-deadline transfer requests wherein there is a penalty no matter how early the transfer completes.

2. The DMA engine as in claim 1, wherein the transaction controller is further adapted to preempt processing of a current transfer by the transaction dispatcher whenever a higher urgency request is received.

3. The DMA engine as in claim 1, wherein the transaction controller assigns one of four priorities ranging from high (0) to low (3), with priority 0 representing hard real-time transfers where there is no penalty if the transfer completes by the deadline and the penalty for missing a deadline is severe, priority 1 representing high-priority zero-deadline soft real-time transfers where there is a definite penalty in a critical path no matter how early the transfer is completed and the penalty increases with completion time, priority 2 representing low-priority zero-deadline soft real-time transfers where there is a definite penalty in a non-critical path no matter how early the transfer is completed and the penalty increases with completion time, and priority 3 representing soft real-time transfers where there is no penalty if the transfer completes by the deadline and the penalty for missing a deadline is tolerable.

4. The DMA engine as in claim 3, wherein the transaction controller is further adapted to schedule transfer requests in timeslices according to priority so as to bound latency of lower priority transfer requests, and with priority 0 transfer requests having the largest timeslice.

5. The DMA engine as in claim 4, wherein priority 0 transfer requests are assigned to a first timeslice and priority 1, 2 and 3 transfer requests are all assigned to a second timeslice.

6. The DMA engine as in claim 3, wherein the set of FIFO registers include a set of command FIFO registers, each servicing a different transfer priority.

7. The DMA engine as in claim 1, wherein the transaction controller is adapted to post service requests of the transaction dispatcher for preparing a next data transfer transaction while a current data transfer transaction by the transaction dispatcher is still in progress.

8. A method of processing direct memory access (DMA) transfer requests of a data processing system, comprising:

interpreting transfer requests received from the data processing system;
determining a transfer urgency for the transfer requests based on both a transfer deadline and a transfer priority, such that higher priority transfers have higher urgency, and equal priority transfers with earlier deadlines have higher urgency, and wherein the transfer priority is based on a hardness representing a penalty for missing a deadline and is also assigned to zero-deadline transfer requests wherein there is a penalty no matter how early the transfer completes;
scheduling among multiple transfer requests based on the determined transfer urgency; and
controlling command and data octet transfers through a set of FIFO registers to and from a DRAM controller and a global bus interface in accord with the scheduled transfer requests.

9. The method as in claim 8, further comprising preempting a current transfer whenever a higher urgency request is received.

10. The method as in claim 8, wherein the determining of a transfer urgency includes assigning one of four priorities ranging from high (0) to low (3) to each received transfer request, with priority 0 representing hard real-time transfers where there is no penalty if the transfer completes by the deadline and the penalty for missing a deadline is severe, priority 1 representing high-priority zero-deadline soft real-time transfers where there is a definite penalty in a critical path no matter how early the transfer is completed and the penalty increases with completion time, priority 2 representing low-priority zero-deadline soft real-time transfers where there is a definite penalty in a non-critical path no matter how early the transfer is completed and the penalty increases with completion time, and priority 3 representing soft real-time transfers where there is no penalty if the transfer completes by the deadline and the penalty for missing a deadline is tolerable.

11. The method as in claim 10, wherein transfer requests are scheduled in timeslices according to priority so as to bound latency of lower priority transfer requests, with priority 0 transfer requests having the largest timeslice.

12. The method as in claim 11, wherein priority 0 transfer requests are assigned to a first timeslice and priority 1, 2 and 3 transfer requests are all assigned to a second timeslice.

13. The method as in claim 10, wherein each of a set of command FIFO registers services a different transfer priority.

14. The method as in claim 8, wherein service requests for preparing a next data transfer transaction are posted to a transaction dispatcher while a current data transfer transaction by the transaction dispatcher is still in progress.

15. The method as in claim 8, wherein a burst of multiple data transfers corresponding to a single transfer request are performed.

* * * * *

UNITED STATES PATENT AND TRADEMARK OFFICE
CERTIFICATE OF CORRECTION

PATENT NO. : 8,151,008 B2  
APPLICATION NO. : 12/167096  
DATED : April 3, 2012  
INVENTOR(S) : Moshe B. Simon et al.

Page 1 of 1

It is certified that error appears in the above-identified patent and that said Letters Patent is hereby corrected as shown below:

Column 22, line 35, should read:

-- if (CHANNEL[CURRENT] $\neq$ NULL --.

Column 28, line 66-67, equation, should read:

-- "TR2TY[0] = CONST_C_0, TR2TY[1] = CONST_P_0,TR2TY[2] = --.

Signed and Sealed this  
Seventh Day of August, 2012

David J. Kappos  
*Director of the United States Patent and Trademark Office*